United States Patent
Drumm et al.

(10) Patent No.: US 11,016,600 B2
(45) Date of Patent: May 25, 2021

(54) LATENCY REDUCTION IN TOUCH SENSITIVE SYSTEMS

(71) Applicant: Beechrock Limited, Castletown (IM)

(72) Inventors: Owen Drumm, Dublin (IE); Cathal G. Phelan, Los Altos, CA (US)

(73) Assignee: Beechrock Limited, Castletown (IM)

( * ) Notice: Subject to any disclaimer, the term of this patent is extended or adjusted under 35 U.S.C. 154(b) by 0 days.

(21) Appl. No.: 16/504,127

(22) Filed: Jul. 5, 2019

(65) Prior Publication Data

US 2020/0012408 A1 Jan. 9, 2020

Related U.S. Application Data

(60) Provisional application No. 62/694,640, filed on Jul. 6, 2018.

(51) Int. Cl.
*G06F 3/041* (2006.01)
*G06F 3/042* (2006.01)

(52) U.S. Cl.
CPC ........ *G06F 3/04166* (2019.05); *G06F 3/0421* (2013.01)

(58) Field of Classification Search
CPC ... G06F 3/0428; G06F 3/04166; G06F 3/0421
See application file for complete search history.

(56) References Cited

U.S. PATENT DOCUMENTS

2016/0357325 A1* 12/2016 Beaver ................ G06T 1/60

* cited by examiner

*Primary Examiner* — Charles V Hicks
(74) *Attorney, Agent, or Firm* — Fenwick & West LLP

(57) ABSTRACT

A touch sensitive system includes a touch surface, a display, and a latency control system. The latency control system reduces the latency between a touch event occurring on the touch surface and a graphical response displayed by the display. Specifically, the latency control system is a feedback system that synchronizes touch scan and display operations. The touch scan and display operations are synchronized by adjusting timing parameters, such as the start times and frequencies of the scan and display operations. Thus, the latency control system is an adaptable system that may reduce latency even when the processing times of various operations vary over time.

20 Claims, 17 Drawing Sheets

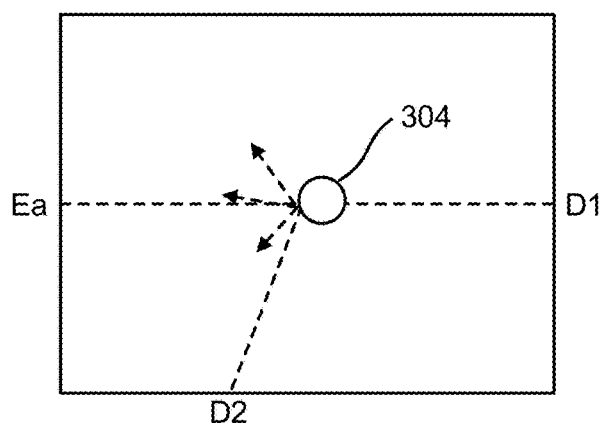
FIG. 3F
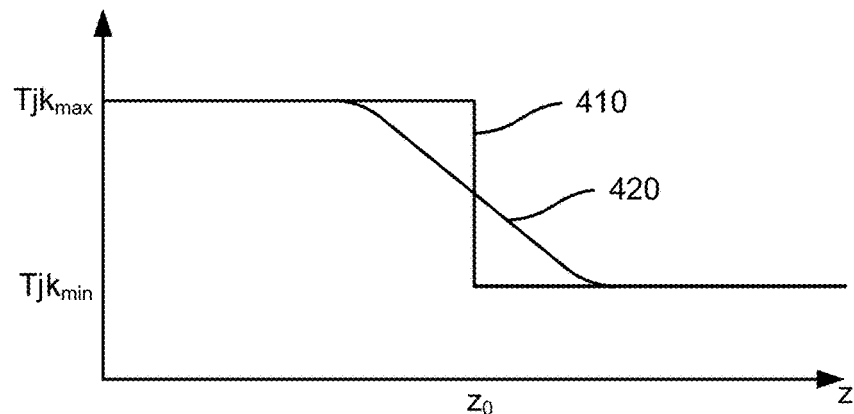
FIG. 4
FIG. 5A  FIG. 5B  FIG. 5C

LATENCY REDUCTION IN TOUCH SENSITIVE SYSTEMS

CROSS REFERENCE TO RELATED APPLICATIONS

This application claims the benefit of priority to U.S. Provisional Patent Application No. 62/694,640, "Latency Reduction in Touch-Sensitive Systems," filed on Jul. 6, 2018, which is incorporated by reference.

BACKGROUND

1. Field of Art

This description generally relates to a touch sensitive device, and specifically to reducing latency between a touch event on the device and displaying an image indicative of the touch event.

2. Description of the Related Art

Touch sensitive displays for interacting with computing devices are becoming more common. A number of different technologies exist for implementing touch sensitive displays and other touch sensitive devices. Examples of these techniques include, for example, resistive touch screens, surface acoustic wave touch screens, capacitive touch screens, and certain types of optical touch screens. Reducing the latency between a user interacting with a touch surface and a display displaying an image indicative of the interaction can enhance the user experience. However, operations performed by subsystems of a touch sensitive system can have variable processing times. For example, the processing time can increase as more touch events occur on the touch surface. This can result in noticeable variations in latency and degrade user experience.

SUMMARY

A touch sensitive system includes a touch surface, a display, and a latency control system. The latency control system reduces the latency between a touch event occurring on the touch surface and a graphical response displayed by the display. Specifically, the latency control system is a feedback system that synchronizes touch scan and display operations. The touch scan and display operations are synchronized by adjusting timing parameters, such as the start times and frequencies of the scan and display operations. Thus, the latency control system is an adaptable system that may reduce latency even when the processing times of various operations vary over time.

Some embodiments relate to a method for reducing latency in a touch sensitive system. Touch data indicating at least one touch event on a touch sensitive surface is received. A buffer write time is determined. The buffer write time is a time at which pixel data in a display buffer is updated based on the touch data is determined. A display update time is determined. The display update time is based on when pixel data from the display buffer is provided to a display. A latency feedback signal is calculated based on the buffer write time and the display update time. A timing parameter of the touch sensitive system is adjusted based on the latency feedback signal such that latency between a subsequent touch event and displaying images based on the subsequent touch event is reduced.

In some embodiments, calculating the latency feedback signal includes calculating a difference between the buffer write time and the display update time. Adjusting the parameter of the touch sensitive system includes decreasing a frequency of a scan operation of the touch sensitive surface responsive to the difference between the buffer write time and the display update time exceeding a threshold and responsive to the buffer write time occurring before the display update time. In some embodiments, adjusting the parameter of the touch sensitive system includes increasing a frequency of a scan operation of the touch sensitive surface responsive to the difference between the buffer write time and the display update time exceeding a second threshold and the buffer write time occurring before the display update time, wherein the second threshold is larger than the threshold.

In some embodiments, calculating the latency feedback signal includes calculating a difference between the buffer write time and the display update time. Adjusting the parameter of the touch sensitive system includes increasing a frequency of a display operation of the display system responsive to the difference between the buffer write time and the display update time exceeding a threshold and responsive to the buffer write time occurring before the display update time. In some embodiments, adjusting the parameter of the touch sensitive system includes decreasing a frequency of a display operation of the display system responsive to the difference between the buffer write time and the display update time exceeding a second threshold and the buffer write time occurring before the display update time, wherein the second threshold is larger than the threshold.

In some embodiments, calculating the latency feedback signal includes calculating a difference between the buffer write time and the display update time. Adjusting the parameter of the touch sensitive system includes delaying a start time of a scan operation of the touch sensitive surface responsive to the difference between the buffer write time and the display update time exceeding a threshold and responsive to the buffer write time occurring before the display update time. In some embodiments, adjusting the parameter of the touch sensitive system comprises accelerating a start time of a scan operation of the touch sensitive surface responsive to the difference between the buffer write time and the display update time exceeding a second threshold and the buffer write time occurring before the display update time, wherein the second threshold is larger than the threshold.

In some embodiments, calculating the latency feedback signal includes calculating a difference between the buffer write time and the display update time. Adjusting the parameter of the touch sensitive system includes accelerating a start time of a display operation of the display system responsive to the difference between the buffer write time and the display update time exceeding a threshold and responsive to the buffer write time occurring before the display update time. In some embodiments, adjusting the parameter of the touch sensitive system includes delaying a start time of a display operation of the display system responsive to the difference between the buffer write time and the display update time exceeding a second threshold and the buffer write time occurring before the display update time, wherein the second threshold is larger than the threshold.

In some embodiments, multiple buffer write times are determined and multiple display update times are determined. Calculating the latency feedback signal includes calculating an average, a median, or a percentile difference between the buffer write times and the display update times.

In some embodiments, determining the buffer write time comprises estimating, by a model, the buffer write time based on the touch data.

In some embodiments, the display buffer is a double buffer and the display update time is a time at which a back frame is switched to a front frame.

In some embodiments, the display buffer is a single buffer and the display update time is a time at which a portion of one or more pixels in the display buffer is sent to the display.

In some embodiments, the display update time is before the buffer write time and corresponds to a most recent update of the display.

Other embodiments relate to a system including one or more processors and a computer-readable storage medium comprising executable computer program code. When executed, the computer program code, causes the one or more processors to perform any combination of the operations previously described.

Other embodiments relate to a non-transitory computer-readable storage medium storing executable computer program code. When the code is executed by one or more processors, the one or more processors perform any combination of the operations previously described.

BRIEF DESCRIPTION OF DRAWINGS

Embodiments of the present disclosure will now be described, by way of example, with reference to the accompanying drawings.

FIG. 3A-3F illustrate example mechanisms for a touch interaction with an optical beam, according to some embodiments.

FIG. 4 is a graph of binary and analog touch interactions, according to an embodiment.

FIGS. 5A-5C are top views of differently shaped beam footprints, according to some embodiments.

DETAILED DESCRIPTION

I. Introduction
A. Device Overview

Figure 1:
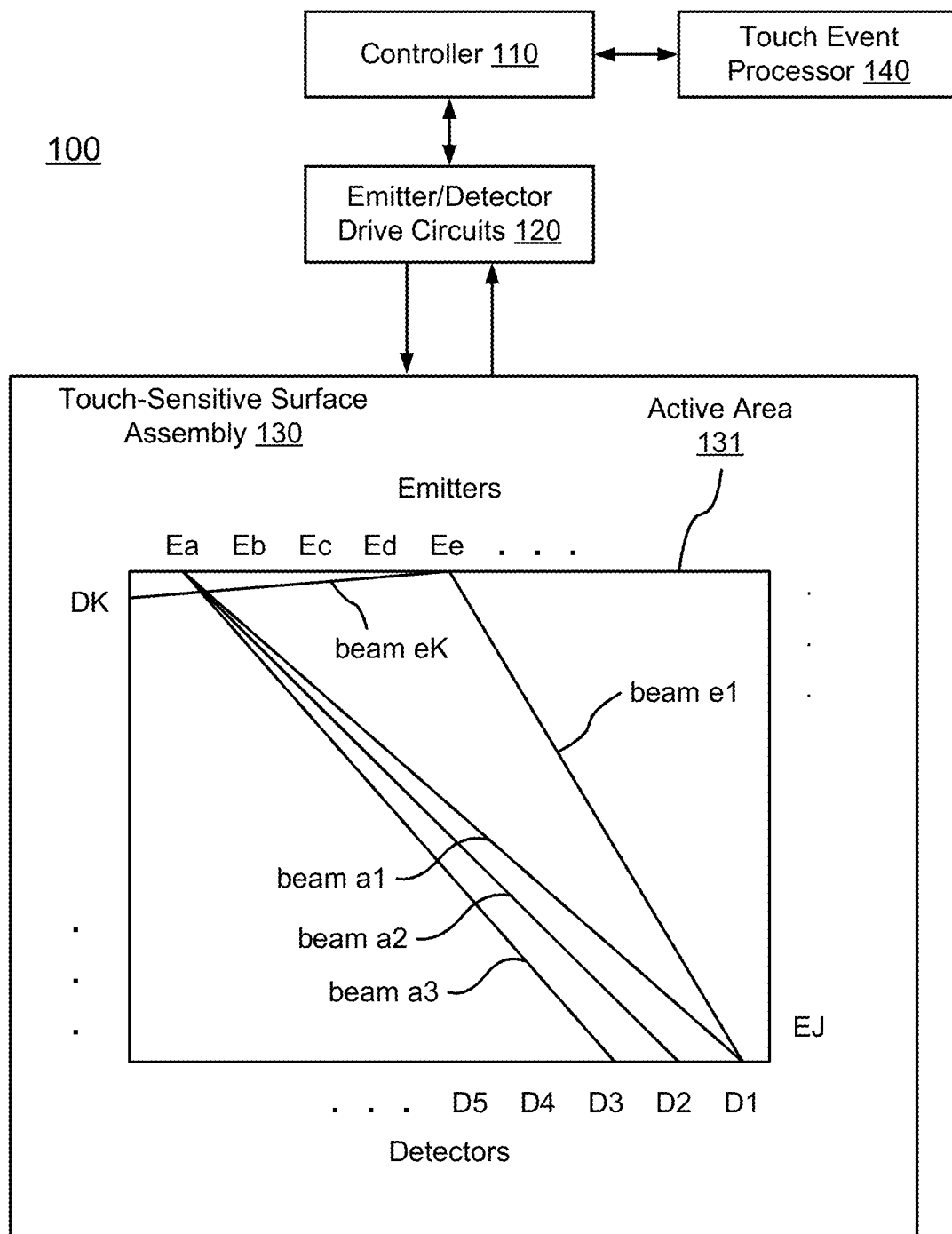
FIG. 1 is a diagram of an optical touch sensitive device, according to an embodiment.

FIG. 1 is a diagram of an optical touch sensitive device 100, according to one embodiment. The optical touch sensitive device 100 includes a controller 110, emitter/detector drive circuits 120, and a touch sensitive surface assembly 130. The surface assembly 130 includes a surface 131 over which touch events are to be detected. For convenience, the area defined by surface 131 may sometimes be referred to as the active touch area or active touch surface, even though the surface itself may be an entirely passive structure. The assembly 130 also includes emitters and detectors arranged along the periphery of the active touch surface 131 (although the emitters and detectors may only be arranged along a portion of the periphery). In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active touch area 131 will disturb certain beams, thus changing what is received at the detectors Dk. Data about these changes is communicated to the touch event processor 140, which analyzes the data to determine the location(s) (and times) of touch events on surface 131.

The emitters and detectors may be interleaved around the periphery of the sensitive surface. In other embodiments, the number of emitters and detectors are different and are distributed around the periphery in any defined order. The emitters and detectors may be regularly or irregularly spaced. In some cases, the emitters and/or detectors may be located on less than all of the sides (e.g., one side). In some embodiments, the emitters and/or detectors are not located around the periphery (e.g., beams are directed to/from the active touch area 131 by optical beam couplers). Reflectors may also be positioned around the periphery to reflect optical beams, causing the path from the emitter to the detector to pass across the surface more than once. For each emitter-detector pair, a beam is defined by combining light rays propagating from an emitter and a detector. In some implementations, the disturbance of a beam is characterized by its transmission coefficient, and the beam attenuation is determined from the transmission coefficient.

One advantage of an optical approach as shown in FIG. 1 is that this approach scales well to larger screen sizes. Since the emitters and detectors may be positioned around the periphery, increasing the screen size by a linear factor of N means that the periphery also scales by a factor of N compared to $N^2$ for conventional touch devices.

B. Process Overview

Figure 2:
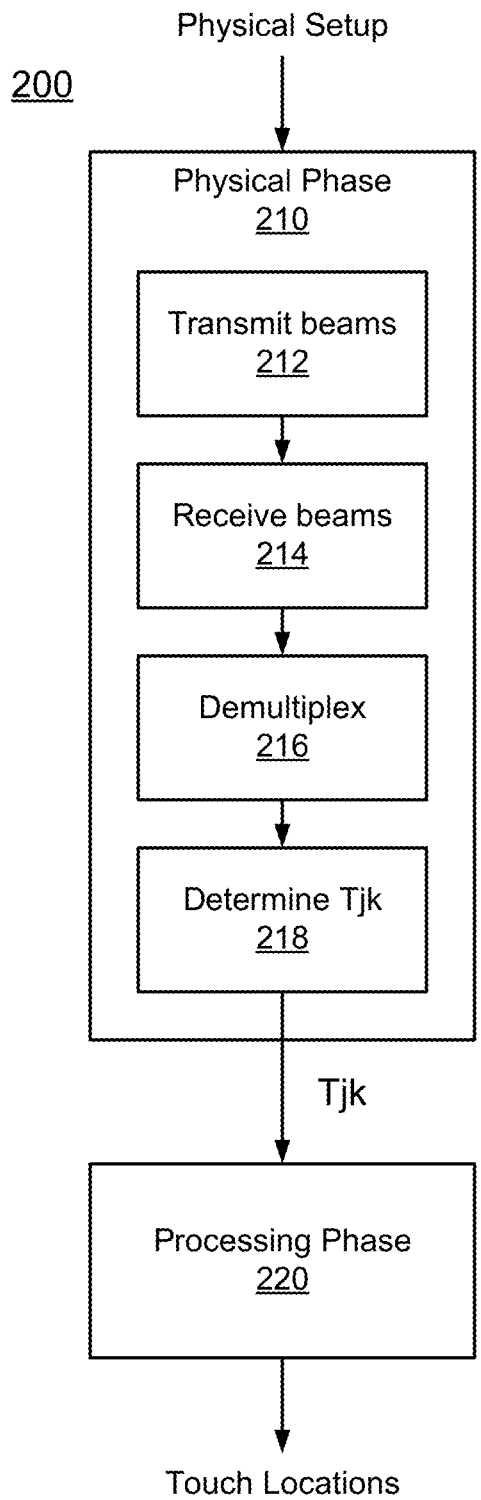
FIG. 2 is a flow diagram for determining the characteristics of touch events, according to an embodiment.

FIG. 2 is a flow diagram for determining the characteristics of touch events, according to an embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection, or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are indicated below, primarily in Section II.

The interior of block 210 shows one possible implementation of process 210. In this example, emitters transmit 212 beams to multiple detectors. Some of the beams travelling across the touch sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 computes the touch characteristics and can be implemented in many different ways. Candidate touch points, line imaging, location interpolation, touch event templates and multi-pass approaches are all examples of techniques that may be used to compute the touch characteristics (such as touch location and touch strength) as part of the processing phase 220. Several of these are identified in Section III.

II. Physical Set-Up

The touch sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Not all touch objects are equally good beam attenuators, as indicated by their transmission coefficient Tjk. Beam attenuation mainly depends on the volume and transparency of the object portion that is interacting with the beam, i.e. the object portion that intersects the beam propagation volume.

Figure 3A:
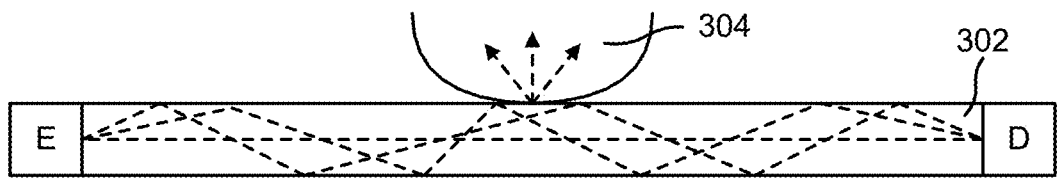

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent planar waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3B:

FIG. 3B illustrates a mechanism based on beam blockage (also referred to as an "over the surface" (OTS) configuration). Emitters produce beams which are in close proximity to a surface 306. An object 304 coming into contact with the surface 306 will partially or entirely block beams within the contact area. FIGS. 3A and 3B illustrate some physical mechanisms for touch interactions, but other mechanisms can also be used. For example, the touch interaction may be based on changes in polarization, scattering, or changes in propagation direction or propagation angle (either vertically or horizontally).

Figure 3C:
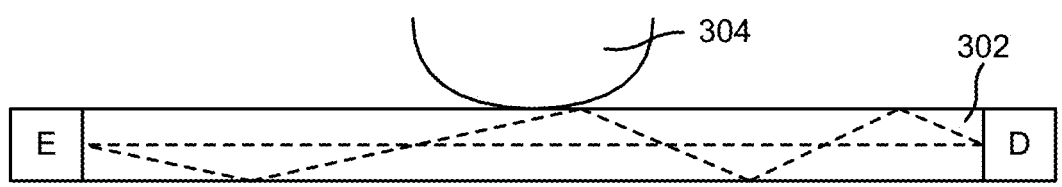

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating. In FIG. 3C, the optical beam travels at a steeper angle of propagation after the touch 304. The detector D has a response that varies as a function of the angle of propagation. The detector D could be more sensitive to the optical beam travelling at the original angle of propagation or it could be less sensitive. Regardless, an optical beam that is disturbed by a touch 304 will produce a different response at detector D.

Figure 3D:
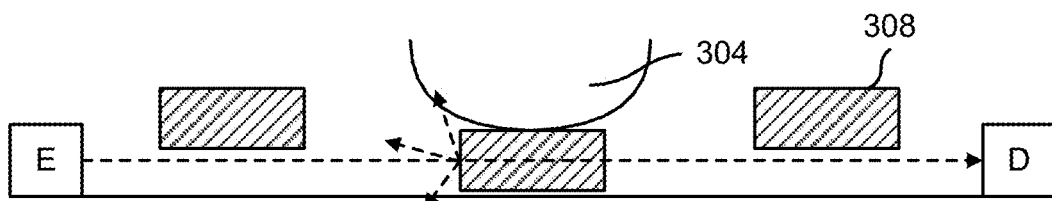

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:
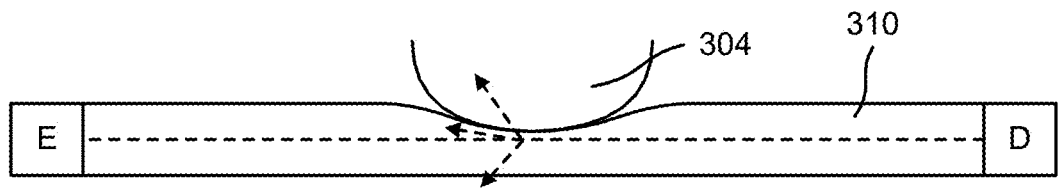

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be more opaque than the lower part, so that compression decreases the transmittance. Alternatively, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking. Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

FIG. 4 is a graph illustrating a binary touch interaction mechanism compared to an analog touch interaction mechanism. FIG. 4 graphs the transmittance Tjk as a function of the depth z of the touch. The dimension z is into and out of the active surface. Curve 410 is a binary response. At low z (i.e., when the touch has not yet disturbed the beam), the transmittance Tjk is at its maximum. However, at some point z0, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors and Couplers

Each emitter transmits light to a number of detectors. Usually, each emitter outputs light to more than one detector simultaneously. Similarly, each detector may receive light from a number of different emitters. The optical beams may be visible, infrared (IR) and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths are shown unfolded for clarity. Thus, sources, optical beams and sensors are shown as lying in one plane. In actual implementations, the sources and sensors typically do not lie in the same plane as the optical beams. Various coupling approaches can be used. For example, a planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Pat. No. 9,170,683, entitled "Optical Coupler," which is incorporated by reference herein.

D. Optical Beam Paths

Another aspect of a touch sensitive system is the shape and location of the optical beams and beam paths. In FIG. 1, the optical beams are shown as lines. These lines should be interpreted as representative of the beams, but the beams themselves are not necessarily narrow pencil beams. FIGS. 5A-5C illustrate different beam shapes when projected onto the active touch surface (beam footprint).

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
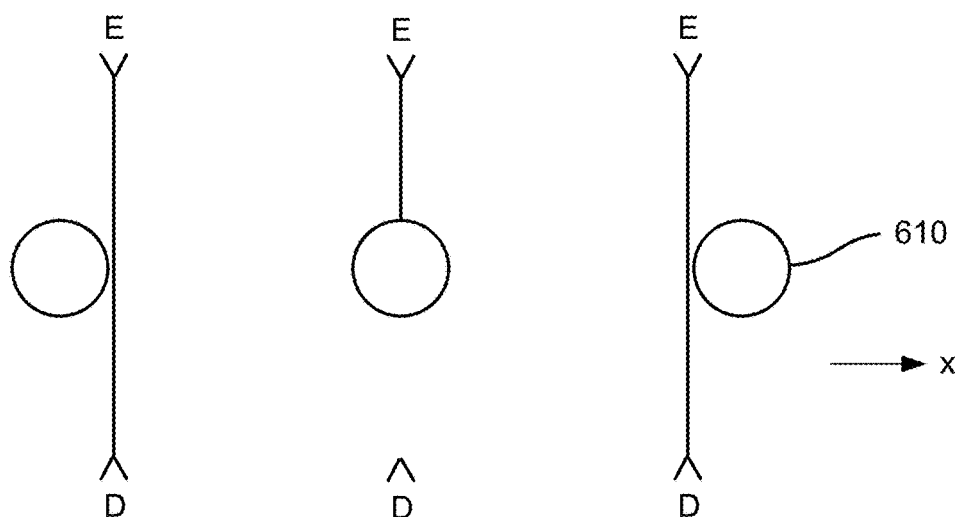
FIGS. 6A-6B are top views illustrating a touch point travelling through a narrow beam and a wide beam, respectively, according to some embodiments.
Figure 6B:
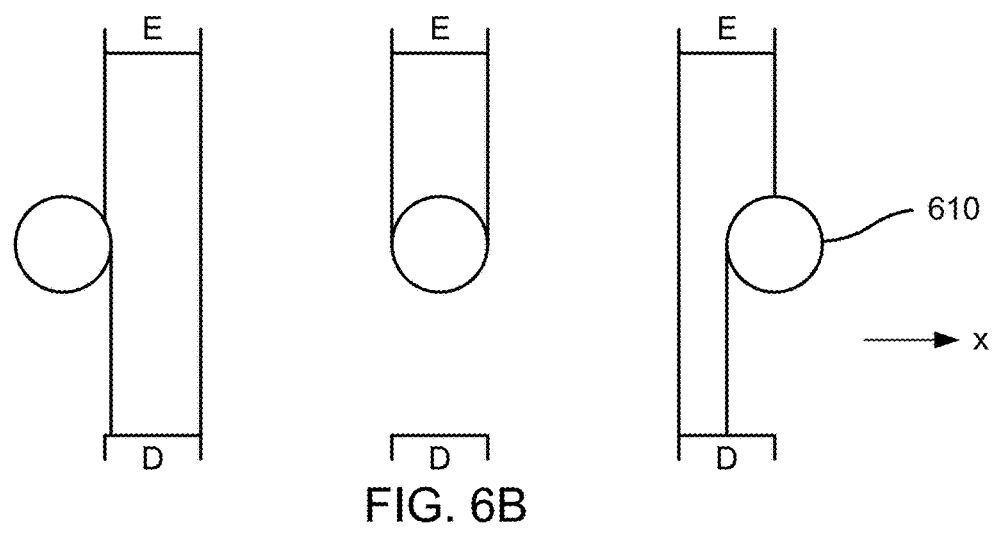
Figure 7:
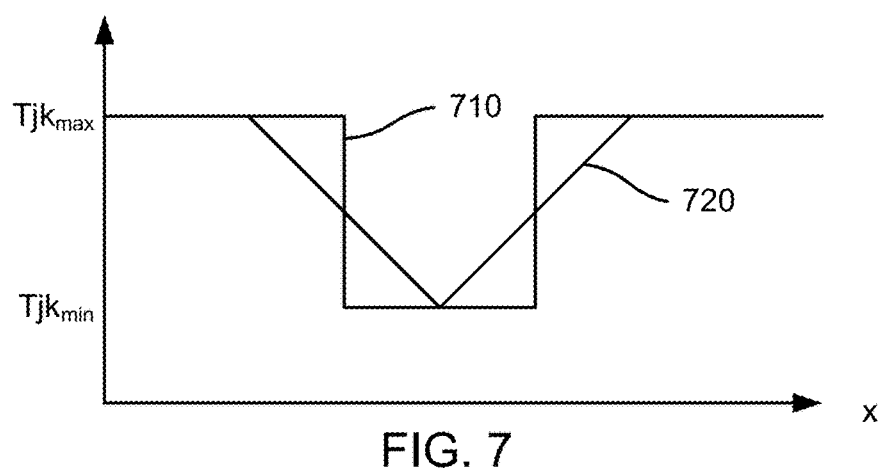
FIG. 7 is a graph of the binary and analog responses for the narrow and wide beams of FIG. 6, according to some embodiments.

FIGS. 6A-6B and 7 show, for a constant z position and various x positions, how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

E. Active Touch Area Coverage

Figure 8A:
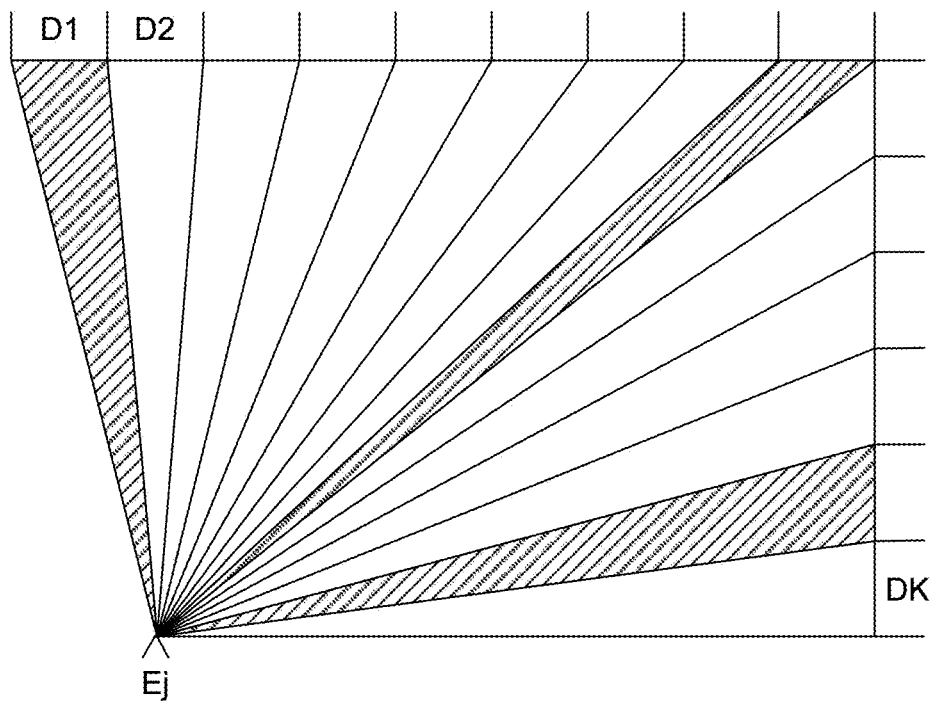
FIGS. 8A and 8B are top views illustrating active touch area coverage by emitters, according to some embodiments.
Figure 8B:
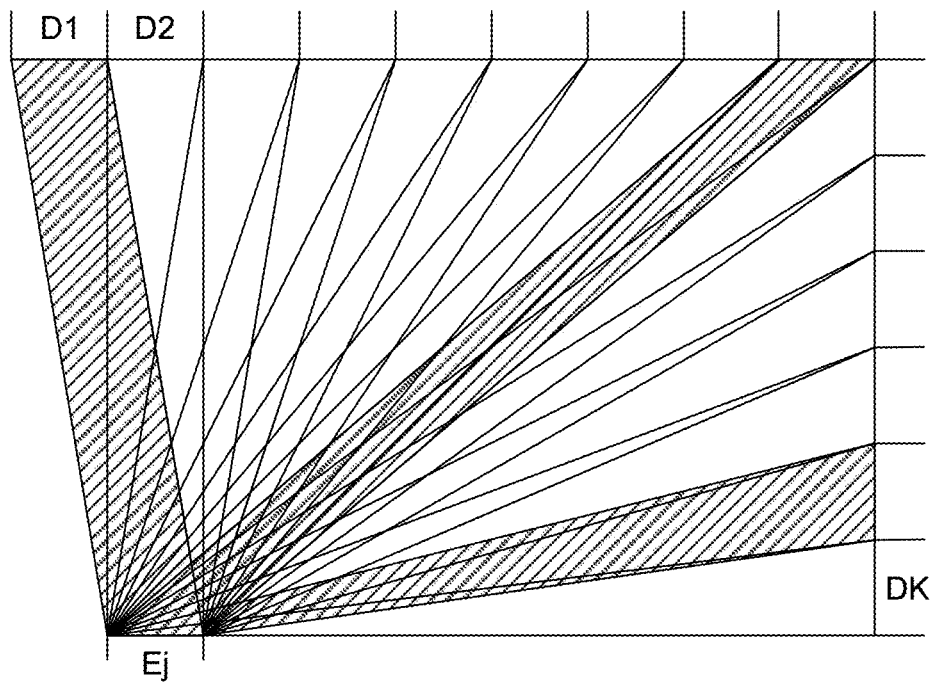

FIG. 8A is a top view illustrating the beam pattern produced by a point emitter. Emitter Ej transmits beams to wide detectors D1-DK. Three beams are shaded for clarity: beam j1, beam j(K−1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but they are referred to as rectangular for convenience). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors), and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore, an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active touch area 131. However, not all points within the active touch area 131 will be covered equally. Some points may be traversed by many beam paths while other points traversed by far fewer. The distribution of beam paths over the active touch area 131 may be characterized by calculating how many beam paths traverse different (x,y) points within the active touch area 131. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

Figure 8C:
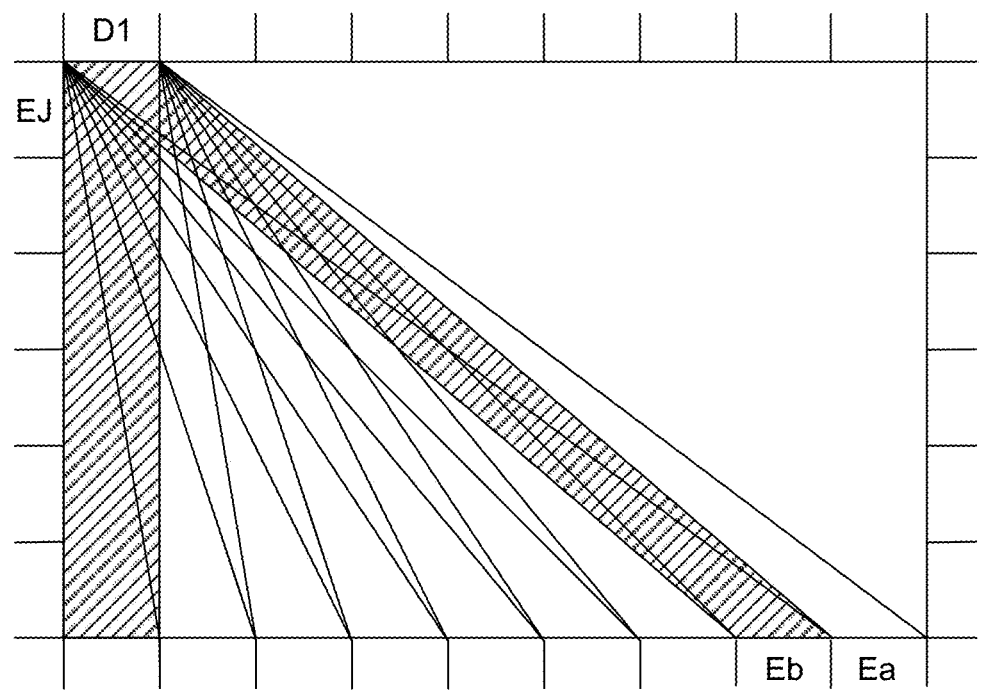
FIGS. 8C and 8D are top views illustrating active touch area coverage by detectors, according to some embodiments.
Figure 8D:
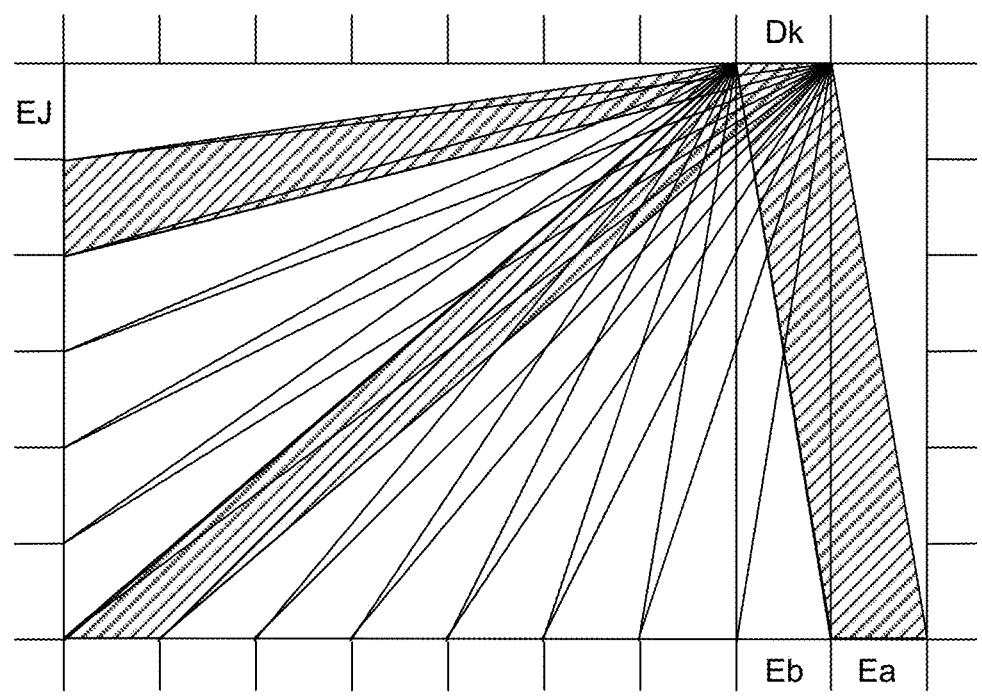

The discussion above for emitters also holds for detectors. The diagrams constructed for emitters in FIGS. 8A-8B can also be constructed for detectors. For example, FIG. 8C shows a similar diagram for detector D1 of FIG. 8B. That is, FIG. 8C shows all beam paths received by detector D1. Note that in this example, the beam paths to detector D1 are only from emitters along the bottom edge of the active touch area. The emitters on the left edge are not worth connecting to D1 and there are no emitters on the right edge (in this example design). FIG. 8D shows a diagram for detector Dk, which is an analogous position to emitter Ej in FIG. 8B.

A detector Dk's coverage area is then the aggregate of all footprints for beams received by a detector Dk. The aggregate of all detector coverage areas gives the overall system coverage.

The coverage of the active touch area 131 depends on the shapes of the beam paths, but also depends on the arrangement of emitters and detectors. In most applications, the active touch area is rectangular in shape, and the emitters and detectors are located along the four edges of the rectangle.

Figure 8E:
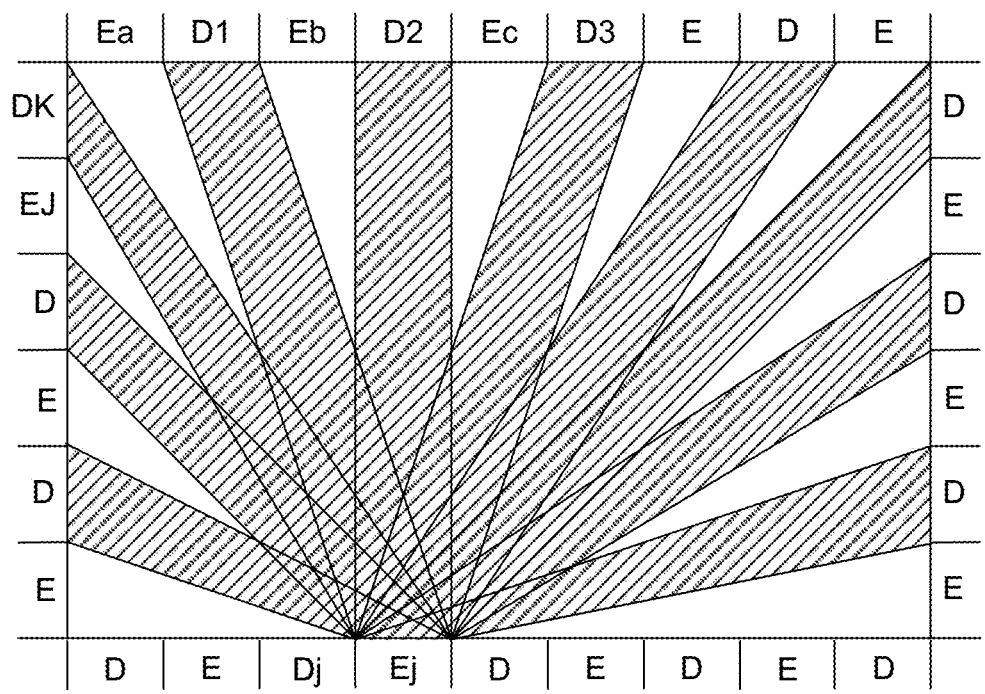
FIG. 8E is a top view illustrating alternating emitters and detectors, according to an embodiment.

In a preferred approach, rather than having only emitters along certain edges and only detectors along the other edges, emitters and detectors are interleaved along the edges. FIG. 8E shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. Pat. No. 8,227,742, entitled "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller cycles through the emitters quickly enough to meet a specified touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients Tjk are used to determine the characteristics (e.g., location) of a touch event (also referred to as a touch point). For location characterization, different approaches and techniques can be used, including candidate touch points, line imaging, location interpolation, touch event templates, multi-pass processing and beam weighting. These approaches are described in further detail in U.S. Pat. No. 8,350,831, "Method and Apparatus for Detecting a Multi-touch Event in an Optical Touch sensitive Device," which is incorporated herein by reference. These approaches are also described in further detail in U.S. Pat. No. 9,092,092, "Detecting Multitouch Events in an Optical Touch sensitive Device Using Touch Event Templates," which is incorporated herein by reference. The transmission coefficients Tjk may also be used to identify the touch object (e.g., finger, stylus, or other instrument) of a touch event. Various methods are described in further detail in U.S. Pat. No. 9,791,976, "Instrument Detection with an Optical Touch Sensitive Device," which is incorporated herein by reference.

IV. Latency Reduction

A. Touch Sensitive System

Figure 9:
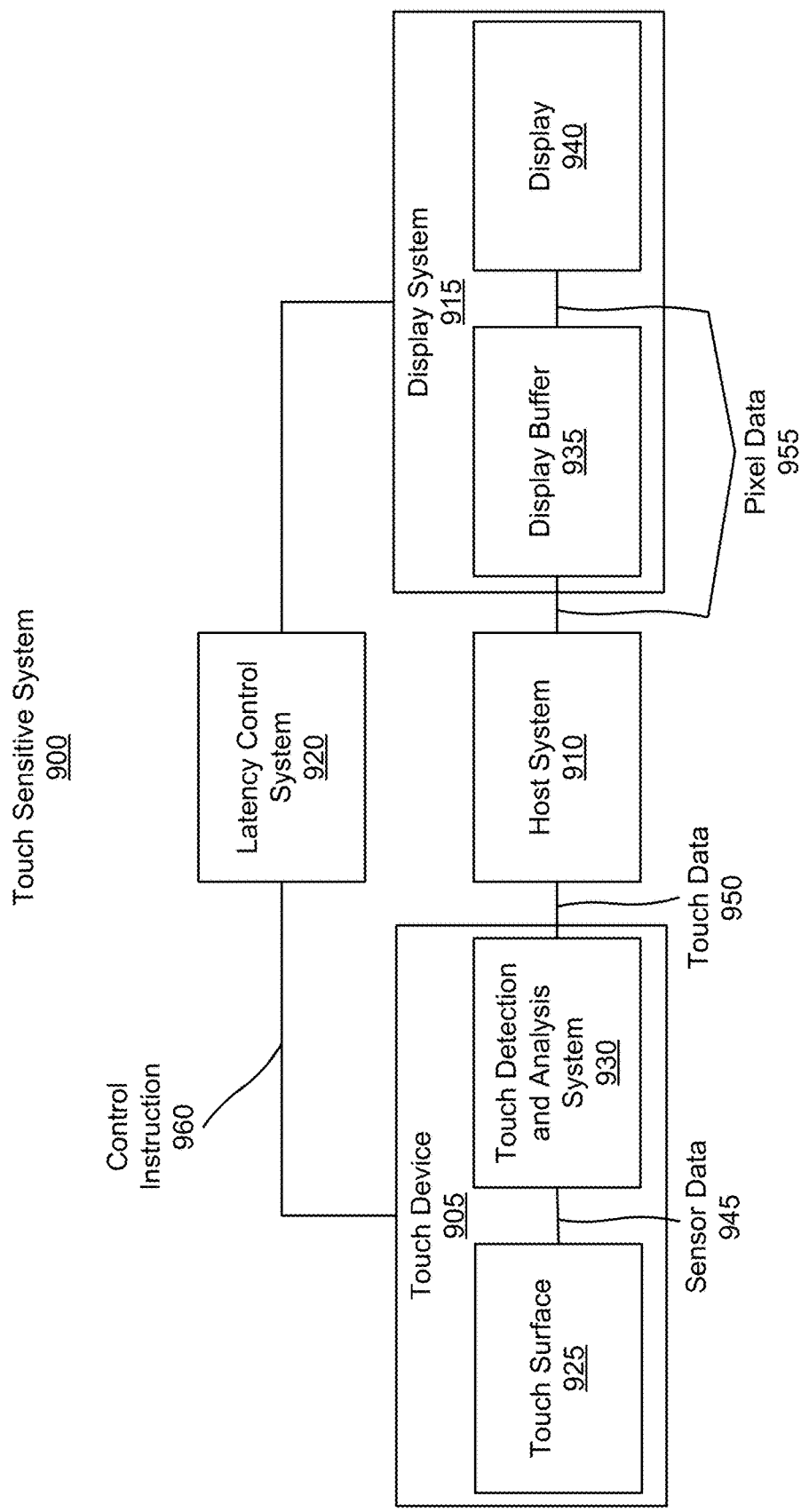
FIG. 9 is a block diagram of a touch sensitive system, according to an embodiment.

FIG. 9 is a block diagram of a touch sensitive system 900, according to an embodiment. The touch sensitive system 900 includes a touch device 905, a host system 910, a display system 915, and a latency control system 920. The touch device 905 includes a touch surface 925 and a touch detection and analysis system 930, and the display system 915 includes a display buffer 935 and a display 940. The touch surface 925 provides sensor data 945 to the detection and analysis system 930, the detection and analysis system 930 provides touch data 950 to the host system 910, the host system 910 provides pixel data 955 to the buffer 935, and the buffer 935 provides pixel data 955 to the display 940. The latency control system 920 provides control instructions 960 to the touch device 905 and the display system 915. The touch sensitive system 900 may include addition or different components than those illustrated in FIG. 9.

The touch sensitive system 900 displays images to a user via the display 940. In some cases, the images indicate touch events that occurred on the touch surface 925. For example, in a drawing application, the touches on the surface 925 are translated into annotations displayed on the display 940. As further described below, the touch sensitive system 900 coordinates operations of its components to reduce the latency between a touch event and displaying an image indicative of the touch event (referred to as a display cycle). Reducing this latency results in a more pleasant and rewarding user experience.

The touch device 905 produces touch data 950 based on touch events that occur on the touch surface 925. Example touch devices 905 include resistive touch devices, capacitive touch devices, and optical touch sensitive devices (e.g., described with reference to FIG. 1). The surface 925 includes a touch surface and touch sensors (e.g., emitters and detectors) that detect touch objects interacting with the surface. The surface 925 transmits sensor data 945 (e.g., transmission coefficients Tjk of beams) to the touch detection and analysis system 930. The touch detection and analysis system 930 determines touch data 950 based on the sensor data 945. The touch data 950 indicates whether touch events occurred and, if so, the location of the touch events on the surface 925. The touch data may also indicate other characteristics of the touch events, such as sizes of the touch events and the touch objects responsible for the touch events (e.g., finger, stylus, palm, etc.). A set of touch data 950 may indicate characteristics of a single touch event or multiple touch events. If a set of sensor data 950 indicates multiple touch events, the touch detection and analysis system 930 may send a set of new touch data 950 for each touch event or wait until touch data is determined for all touch events in the sensor data 950 before sending touch data 950. If the touch device is an optical touch sensitive device 100, then the detection and analysis system 930 may determine touch data 950 by performing methods identified in Section III.

The host system 910 determines pixel data 955 to be displayed by the display system 915. The pixel data 955 may be based on the touch data 950 received from the touch device 905. The pixel data 955 may include color values for each pixel (or subpixel) in a video frame. The host system 910 may include a computer operating system and one or more programs or applications running on the host system 910. For example, the host system 910 runs a drawing application that converts touch data 950 indicating touch events on the touch surface 925 into annotations to be displayed by the display system 915.

The display system 915 displays images based on the pixel data 955 that is received from the host system 910. The display buffer 935 (also referred to as a frame buffer) is a memory that temporarily stores pixel data 955 before the pixel data 955 is provided to the display 940. For example, the buffer 935 is a memory store in a driving system of the display system 915.

In some embodiments, the display buffer 935 stores two (or more) video frames at the same time. In these embodiments, pixel data 955 stored in a first frame is sent to the display 940 while pixel data 955 stored in a second frame is updated with new pixel data 955. The frame that provides pixel data 955 to the display 940 is referred to as the front frame, and the frame that is being updated is referred to as the back frame. At a display update time (e.g., a time after data in the front frame is sent to the display), the frames are swapped such that that pixel data 955 stored in the second frame is sent to the display 940 while pixel data stored in the first frame is updated with new pixel data 955. Thus, at the display update time, the back frame becomes the front frame and the front frame becomes the back frame. This may be referred to as double buffering or page flipping. Among other advantages, double buffering allows pixel data 955 to be written to the buffer 935 without disturbing pixel data 955 being sent to the display 940.

Alternatively, the display buffer 935 may be a single buffer. In this case, pixel data 955 stored in a frame is sent to the display system 915 while new pixel data 955 is simultaneously written to the same frame. Subsets of pixels in the frame are sent to the display (e.g., pixels are sent to the display line by line) rather than sending the entire frame at once (e.g., as done by double buffer systems). Although a single buffer eliminates latencies associated with swapping buffers in a double buffer system, a single buffer has the disadvantage of storing new and old pixel data in a single frame. This can result in undesirable image artifacts being displayed to a user. For example, if the buffer 935 is only partially updated with new pixel data 955 before pixel data is sent to the display system 915, the display 940 may display a video frame that includes new and old pixel data. Single buffers may be particularly susceptible to this effect when graphical objects are moving across the screen of the display 940. To avoid this undesirable effect and other complications associated single buffer systems, single buffer systems generally have increased processing overhead compared to double buffers.

The display 940 displays images sequentially based on the frames received from the buffer 935. Specifically, for each image, the display 940 retrieves pixel data 955 stored in the buffer 935 and displays an image based on the retrieved pixel data 955. Instead of displaying all pixels at once, the display 940 may display subsets of pixels (or subpixels) at a time (e.g., line by line). Thus, the display 940 can display content that represents touch events on the touch surface 925. The display 940 may be arranged behind the touch surface 925 to form a touchscreen. Examples of the display 940 include a liquid crystal display (LCD) and an organic light-emitting diode (OLED) display.

The latency control system 920 provides control instructions 960 to the touch device 905 and the display system 915 to reduce the latency of the touch sensitive system 900. The latency control system 920 may also communicate with the host system 910. The control instructions 960 provide instructions to adjust one or more timing parameters of the touch sensitive system 900. The latency control system 920 and the timing parameter adjustments are further described below.

Figure 10:
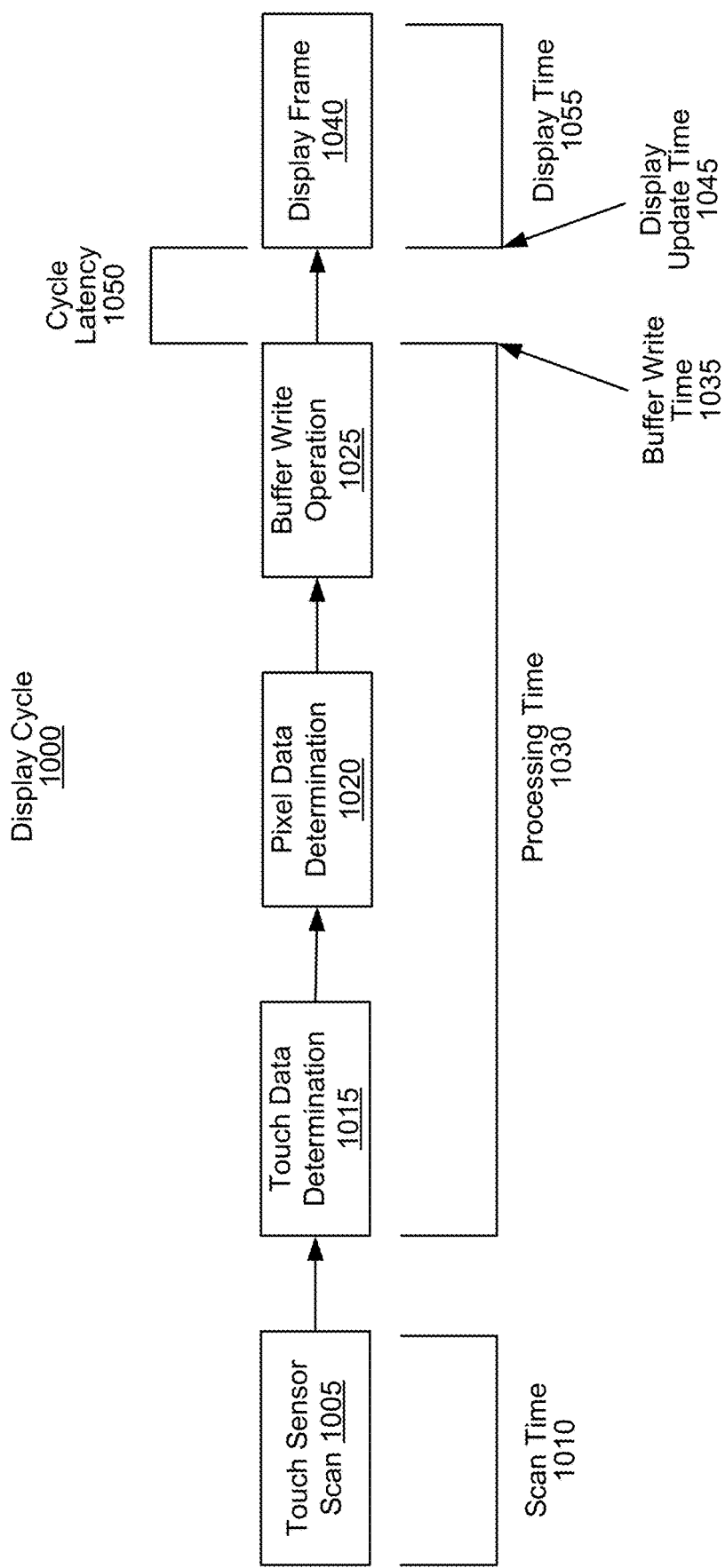
FIG. 10 is a flowchart of a display cycle performed by the touch sensitive system, according to an embodiment.

FIG. 10 is a flowchart illustrating operations of a display cycle 1000, according to an embodiment. Each operation may be performed by one or more components described with reference to FIG. 9. The operations may be performed in different orders and the cycle 1000 may include different, additional, or fewer steps. Furthermore, the touch sensitive system 900 may perform one or multiple display cycles 1000 before a first display cycle finishes. For example, a second scan operation 1005 may be performed before touch data is determined for a first scan operation 1005.

A touch sensor scan operation 1005 is performed by the touch surface 925. Scan operations 1005 are performed to detect touch events. New sensor data 945 may be determined after each scan operation 1005. The time duration of a scan operation 1005 is the scan time 1010. Example scan frequencies are 60 or 120 Hz. The specifics of a scan operation 1005 vary depending on the type of touch device 905. For a capacitive touch device, a scan operation may include sequentially applying a sensing voltage to sensing electrodes on the surface 925. For optical touch sensitive devices 100, a scan operation 1005 may include sequentially emitting beams from each detector (e.g., if the device is time division multiplexed) or emitting beams from different emitters simultaneously for a predetermined time period (e.g., if the device is code division multiplexed).

Scan operations 1005 may occur continuously such that a new scan operation 1005 is performed after a previous scan operation 1005 finishes. Alternatively, the latency control system 920 may adjust a parameter such that there are time gaps between scan operations 1005 to increase the flexibility of the start and end times of the scan operations 1005 (further described below). Alternatively or additionally, the frequency of a scan operation 1005 may be increased or decreased. For example, if a typical scan time 1010 of a scan operation is 16.7 ms, the frequency may be increased by the latency control system 920 such that the operation is performed in 16 ms. In some cases, one or more scan operations 1005 are partially performed (e.g., to reduce the scan time 1010). For example, a scan operation 1005 may only be performed to detect touch events at specific locations (e.g., in a quadrant) of the touch surface 925. This may occur if the general location of a touch event is already known (e.g., based on previous touch data) or if further information about a touch event is desired.

A touch data determination 1015 is an operation performed by the touch detection and analysis system 930. The time duration of the touch data determination 1015 may depend on the number of touch events and the location of the touch events. Determining additional touch characteristics, such as determining the touch objects or the size of the touch events, may further increase the processing time. In some embodiments, multiple scan operations are performed to determine a set of touch data. For example, after an initial scan operation, additional information may be needed to confirm or refine the location and size of the touch events.

A pixel data determination 1020 is an operation performed by the host system 910 (or a program or application running on the host system 910). During a pixel data determination 1020, pixel data 955 is determined based on the touch data 950. The pixel data 955 may include color values for each pixel (or subpixel) in a video frame. For example, the host system 910 determines which pixels indicate a touch event (e.g., a user is drawing with a stylus). The time duration of the data determination 1020 may depend on the number of programs or applications running on the host system and the size of a set of touch data 950, the time duration for the operating system scheduler to allocate time for processes necessary for pixel determination, CPU clock throttling (e.g., if the total processing workload causes the CPU to heat up, the host system 910 can reduce the clock speed of the CPU as a temperature limiting mechanism), and interaction or competition with other processes (e.g., cache misses caused by programs evicting data from the cache).

During a buffer write operation 1025, new pixel data 955 is written to the buffer 935. Data may be written sequentially (e.g., line by line) to the buffer 935. In some cases, data is written non-sequentially. Specifically, instead up updating every pixel in a frame, only pixels with new pixel data (compared to a previous frame) are updated in the buffer 935. The writing time of the writing operation 1025 time may depend on the number of pixels being updated and the complexity of the pixel data 955. For example, the writing time will be longer if all pixels in a frame are updated compared to only updating a few pixels. If the time duration of the write operation 1025 is unknown, the time duration may be estimated. In some embodiments, the time duration may be ignored (e.g., the time duration of the write operation 1025 is negligible compared to the other operations). The combined time duration of operations 1015-1025 is referred to as the processing time 1030. The time that the display buffer 935 is updated with new pixel data 955 is referred to as the buffer write time 1035. The buffer write time 1035 may refer to any time during the buffer write operation 1025 that can be consistently identified (e.g., the completion of a sub-process or the end of the buffer write operation 1025). The buffer write time 1035 may be measured from a completion point by a software or hardware routine. For double buffer systems, the buffer write time 1035 refers to the time that the back frame of the buffer 935 is updated with new pixel data 955. For single buffer systems, the buffer write time refers to the time that one or more specified pixels in the buffer 935 are updated with new pixel data 955.

A display operation 1040 includes sending pixel data 955 stored in the buffer 935 to the display 940, which displays a video frame based on the pixel data. To display an image, the display 940 typically reads data from the buffer 935 and sequentially emits light from pixels line by line (e.g., from the top to bottom). The specifics of a scan operation vary depending on the type of touch device 905. For example, for an LCD device, voltages are applied to subpixels to rearrange the liquid crystals in the display.

Video frames may be displayed by the display 940 at a rate of tens or hundreds of frames per second. A typical display update rate is 60 Hz (60 frames per second or a frame approximately every 16.7 ms) or 120 Hz. The time that pixel data 955 stored in the buffer 935 is sent to the display 940 is referred to as the display update time 1045 and the time between the buffer write time 1035 and the display update time 1045 is referred to as the cycle latency 1050. The buffer write time 1035, the display update time 1045, and the cycle latency 1050 can be measured or estimated using hardware or software. For double buffer systems, the display update time 1045 refers to the time that the back frame is switched to the front frame. For single buffer systems, the display update time 1045 refers to the time that one or more specified pixels in the buffer 935 are sent to the display 940. The display update time 1045 may be determined by a software program that monitors one or more processes performed by the display system 915. In some embodiments, the display update time 1045 is estimated based on the display operations 1040 of the display 940.

Typically, frames are displayed sequentially and continuously. Thus, a new frame may be displayed even if pixel data 955 in the buffer 935 is not updated. For example, if new pixel data is not written to the buffer 935 before the display update time 1045, the next frame may be the same as the previous frame. If the buffer writing operation 1025 is incomplete at a display update time 1045, the display 940 may display a frame that includes new and old pixel data or re-display the pervious frame. For example, for a double buffer system, if new pixel data is still being written to the back buffer at the display update time 1045, the frames may not switch such that the previous front frame remains the front frame and the back frame remains the back frame for the next display operation. This can lead to noticeable increases in the cycle latency 1050. For example, if frames are displayed at 60 Hz and the display update time 1045 occurs before the buffer write time 1035, new pixel data will not be sent to the display 940 for another 16.7 ms. Additionally, if pixel updates occur at the bottom of the display 940 the pixel values are the bottom of the display may not be updated for another 16.7 milliseconds (ms) (assuming the display updates from top to bottom). So, in this worst-case example, the total cycle latency 1050 can be 16.7 ms (waiting for swapping of frame buffers)+16.7 ms (top-to-bottom refreshing)+5 ms (other latencies)=38.4 ms. This order of cycle latency 1050 may be noticeable and can impair the perceived responsiveness of the touch sensitive system 900.

Similar to scan operations 1005, the latency control system 920 may adjust timing parameters of the display 940. For example, time gaps between display operations 1040 may be added and frequencies of display operations 1040 may be increased or decreased. Examples of display cycles 1000 and timing parameter adjustments are further described below.

B. Timing Parameter Adjustments

Figure 11:
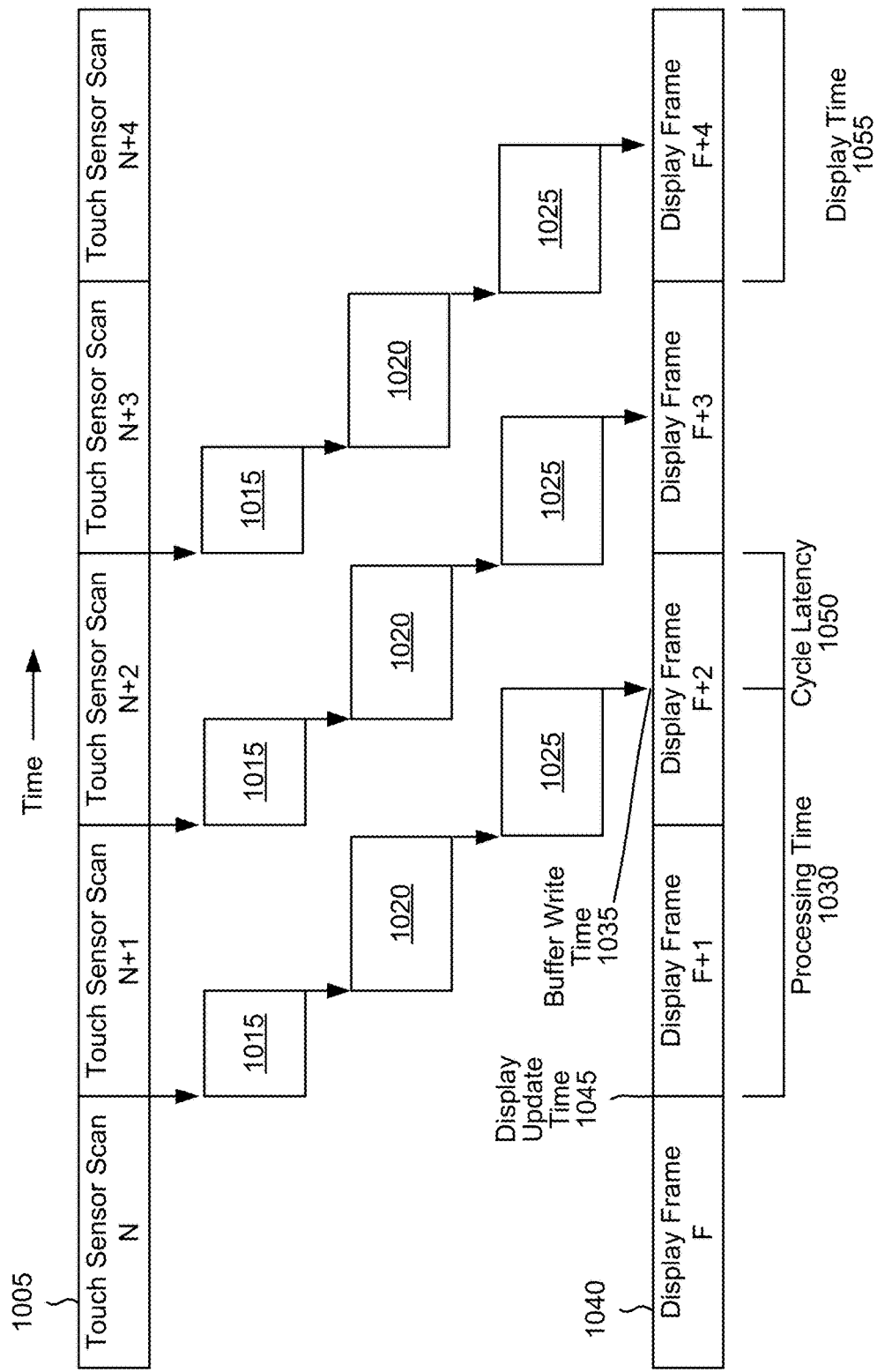
FIG. 11 is a series of display cycles without timing parameter adjustments, according to an embodiment.

FIG. 11 is a series of display cycles 1000 without timing parameter adjustments, according to an embodiment. The scans operations 1005 and display operations 1040 of the cycles 1000 occur sequentially and continuously. Additionally, the scan and display operations have the same frequency and phase. After each scan operation 1005, operations 1015-1025 occur prior to an image being displayed in a frame. Due to the processing time 1030, touches detected in scan N are not displayed until frame F+3, touches detected in scan N+1 are not displayed until frame F+4, etc. The cycles 1000 illustrated in FIG. 11 may be performed by single or double buffer systems.

Scan operations 1005 and display operations 1040 are typically cyclical and have consistent or predictable scan times 1010 and display times 1055, respectively. The processing time 1030 of operations 1015-1025, however may not be consistent. Thus, variations in the processing time 1030 may result in considerable variation between the time a touch event occurs on the surface 925 and a corresponding graphical response appearing on the display 940. Said differently, there may be considerable variation in the cycle latency 1050. As a consequence, pixel data 955 may be many milliseconds old before it becomes visible to the user. This delay can degrade the user experience. For example, in a system where the phase relationship between scan operations 1005 and display operations 1040 is arbitrary, the average latency will be longer than the optimal latency by about half of the sensor report interval or the display refresh period, whichever is smaller. In another example, scan and display operations are performed at 120 Hz (scan/display operations are performed every 8.3 ms). Without latency control system 920, there will be an arbitrary timing relationship between the scan operations 1005 and display operations 1040. Thus, approximately half of the time the display buffer 935 will swap before the write operation 1025 is complete. This can lead to an average additional latency of 8.3 ms/2=4.15 ms).

To reduce the cycle latency 1050 over time (even with varying processing times 1030), the latency control system 920 can adjust parameters of the display cycles 1000 based on latency feedback signals. Specifically, the latency control system 920 provides instructions to adjust the start time and/or frequency of the touch scan operations 1005 and display operations 1040. The adjustments may be implement by any combination of hardware and software components. In some embodiments, adjusting frequencies and start times of display operations 1040 is difficult, cannot be done, or is disruptive to the display system 915. For example, a display 940 may not be designed to have these parameters adjusted. In these embodiments, the latency control system 920 may only adjust the start times and frequencies of scans operations 1005.

Generally, the latency control system 920 provides instructions such that the buffer write time 1035 occurs before the display update time 1045. This results in graphical modifications (pixel updates) being completed shortly before being displayed. For double buffer systems, timing parameter adjustments are made such that the write operation 1025 of new pixel data 955 finishes shortly before the back frame is swapped to the front. Similarly, for single buffer systems, parameters adjustments are made such that the write operation 1025 finishes shortly before the newly modified pixels are sent to the display 940.

The latency control system 920 may adjust timing parameters such that the buffer write time 1035 occurs a threshold time range before the display update time 1045. The threshold range includes a range of desired buffer write times 1035 (relative to a display update time 1045) that reduce the cycle latency 1050 yet are early enough to accommodate variations in scan times 1010 and processing times 1030. Generally, if the buffer write time 1035 occurs earlier than the threshold range, this indicates the cycle latency 1050 is too large, and the latency control system 920 provides instructions to decrease the cycle latency 1050 of a subsequent cycle 1000. Similarly, if the buffer write time 1035 occurs later than the threshold range, this indicates the cycle latency 1050 is too small, and the latency control system 920 provides instructions to increase the cycle latency 1050 of a subsequent cycle 1000. The cycle latency 1050 may be considered too small if the buffer write time 1035 is so close to the display update time 1045 that typical latency variations in a subsequent cycle 1000 may result in the buffer write time 1035 occurring after the display update time 1045.

In some embodiments, if no touch events are detected, the threshold range may be set such that the buffer write time 1035 will occur before the display update time 1045, even if one or more touch events are detected. In some embodiments, the threshold time range is dynamically adjusted by the latency control system 920. For example, if Y touch events are detected on the surface, the threshold range may be adjusted to accommodate Y+1 touches to anticipate additional touch events occurring on the surface. The threshold ranges may be dynamically adjusted based on programs or applications running by the host system 910, the number of detected touch events, and historic processing times 1030, scan times 1010, and display times 1055. In some embodiments, the threshold range includes only a single value (e.g., 1 ms). In these embodiments, the latency control system 920 may adjust parameters in successive cycles to ensure the cycle latency 1050 is approximately the single value.

To determine the timing parameter adjustment, the latency control system 920 calculates a latency feedback signal. The latency feedback signal is based on the buffer write time 1035 and the display update time 1045 of a cycle 1000. For example, the latency feedback signal is the difference between the buffer write time 1035 and the display update time 1045 when the display update time 1045 occurs after the buffer write time 1035. In another example, the latency feedback signal is the average, median, or percentile difference between buffer write times 1035 and the display update times 1045 that occur over several display cycles 1000 (e.g., three or more). The statistical calculations based on multiple cycles 1000 may be performed if calculations based on a single cycle 1000 result in inconsistent or unreliable cycle latencies 1050. In this way, average cycle latency may not be optimized, but worst-case cycle latency may be reduced, for example. In another example, the latency feedback signal is provided by a model that estimates a cycle latency 1050. Inputs to the model may include, the number of touch events, the locations of the touch events, the types of touch events, the number of pixels to be modified, the complexity of the pixel modifications, and any other factors that affect the processing times of operations 1015-1025.

Figure 12:
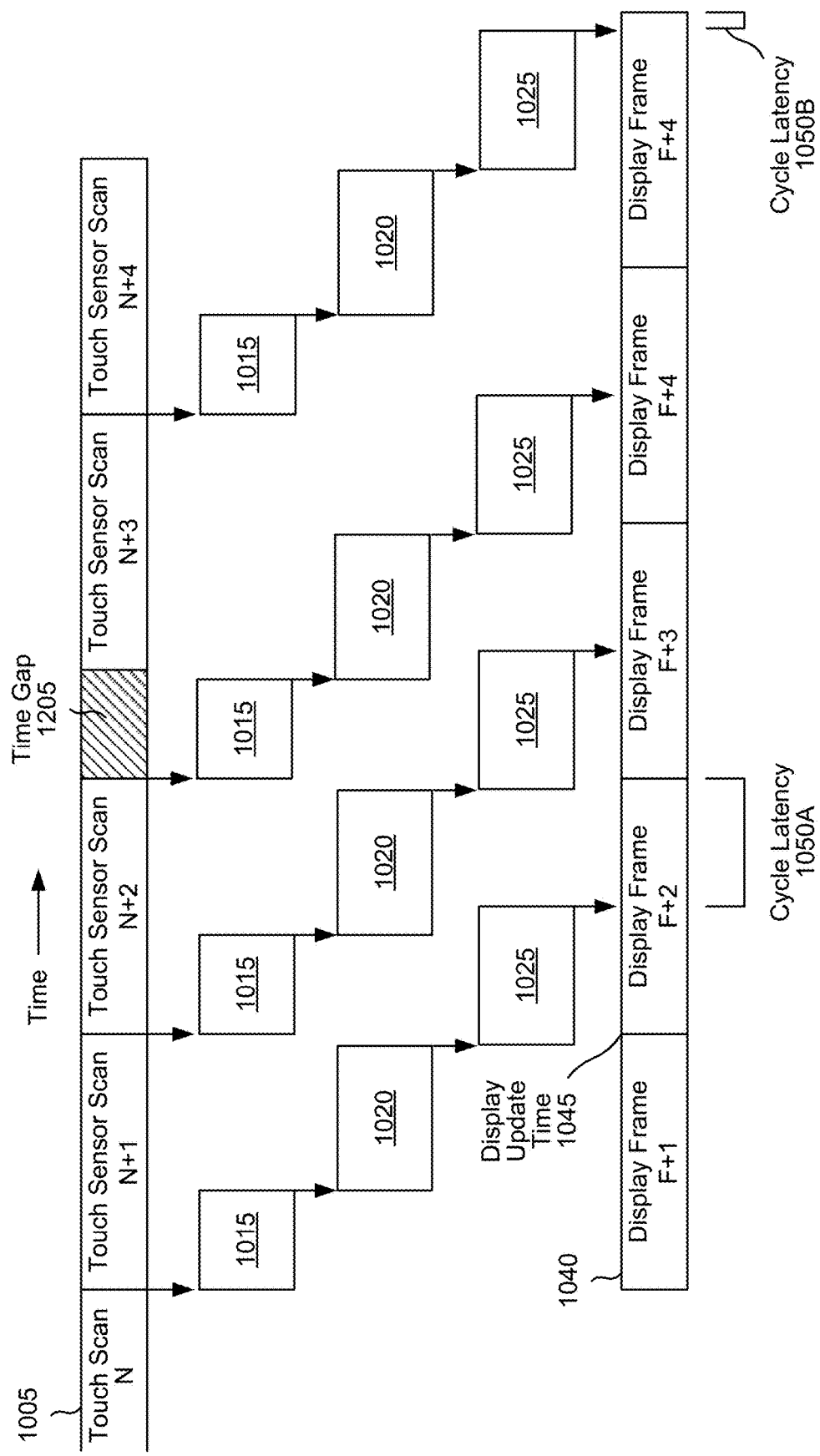
FIGS. 12-17 are display cycles with timing parameter adjustments, according to some embodiments.

FIG. 12 illustrates a time gap 1205 in a series of display cycles 1000, according to an embodiment. FIG. 12 is similar to FIG. 11, except that the start time of scan N+3 is delayed by adding a time gap 1205 after scan N+2. This results in a phase change in the scan operations 1005 compared to the display operations 1040. The cycle latency 1050A before the time gap 1205 is similar to the cycle latency illustrated in FIG. 11. However, due to the time gap 1205, a subsequent cycle latency 1050B is reduced to 1050B.

In an example process, the latency control system 920 determines a latency feedback signal based on the cycle latency of 1050A. To decrease the response time of the latency control system 920, the cycle latency 1050A may be determined based on the buffer write time 1035 and historic display update times 1045. For example, if display times 1055 are consistent, the cycle latency 1050A can be determined from the time difference between the previous display update time 1045 and the buffer write time 1035. Since the cycle latency 1050A is larger than a threshold time (not shown), the latency control system 920 adjusts the start time of the next scan operation 1005 (scan N+3) such that subsequent cycles 1000 have latencies 1050B within the threshold. In some embodiments, instead of adding a single time gap 1205, smaller time gaps may be added to subsequent scan operations 1005 until the latency 1050 is within the threshold. During the time gap 1205, no scans operations 1005 are performed. In some embodiments, a partial scan operation 1005 or a scan operation 1005 with a higher frequency (and thus a shorter scan time 1010) are performed during the time gap 1205. In subsequent cycles 1000, the latency control system 920 may continuously determine and monitor latency feedback signals.

Figure 13:
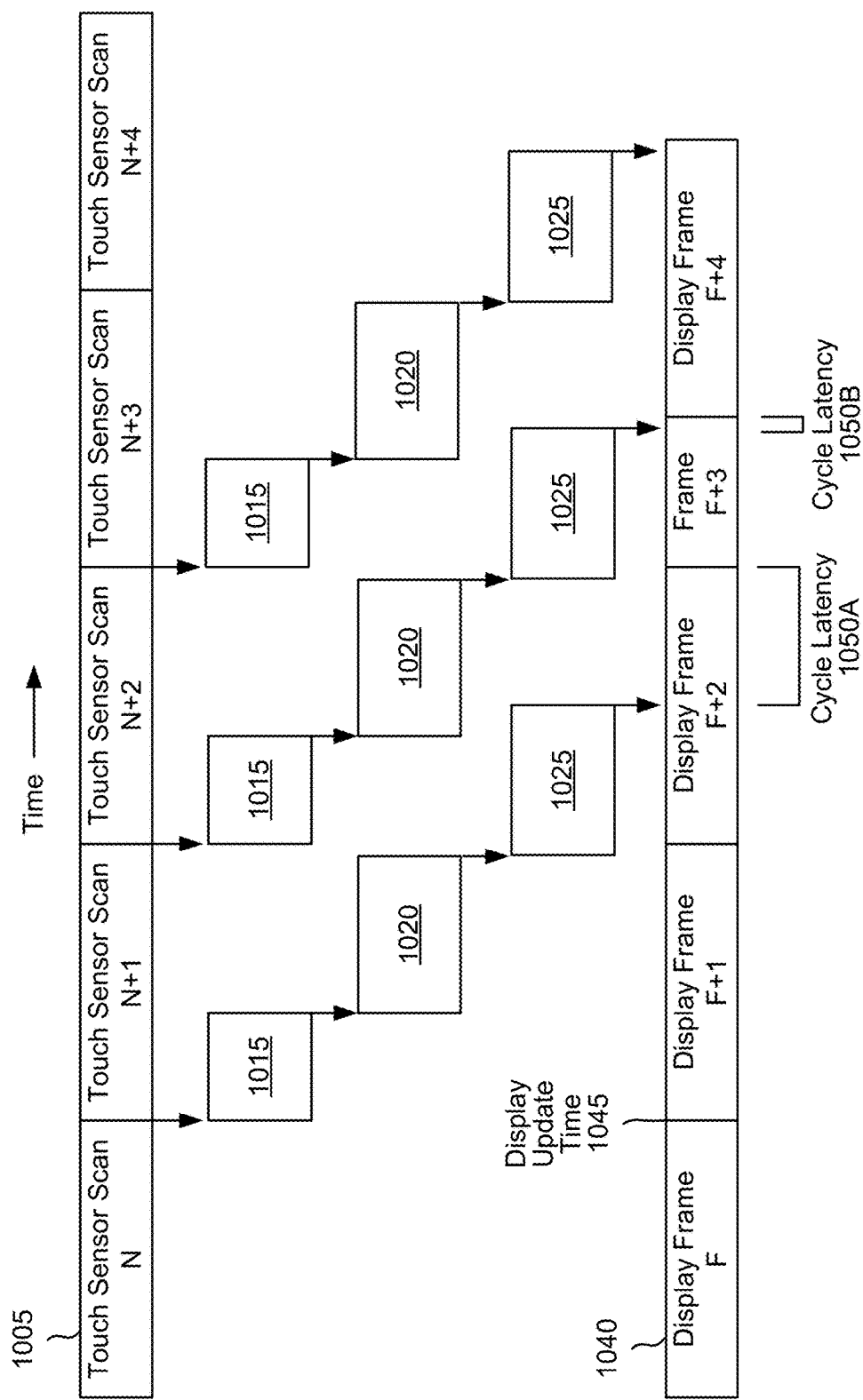

FIG. 13 illustrates a frequency adjustment in a series of display cycles 1000, according to an embodiment. FIG. 13 is similar to FIG. 11, except that the display time 1050 of frame F+3 is shorter. Thus, the cycle latency 1050B associated with frames F+3 and F+4 is reduced compared to the cycle latency 1050A associated with frame F+2.

In an example process, the latency control system 920 determines a latency feedback signal based on cycle latency 1050A. Since the cycle latency 1050A is larger than a threshold time (not shown), the latency control system 920 adjusts the frequency of subsequent frame F+3 such that cycle latency 1050B is within the threshold. During frame F+3 the display 940 performs a typical display operation 1040 at an increased frequency. In some embodiments, instead of making a single frequency adjustment, smaller frequency adjustments may be made to subsequent display operations 1040 until the latency 1050 is within the threshold. For example, the display may be limited by a maximum frequency. Alternatively, instead of adjusting a display operation frequency, the latency control system 920 may adjust the frequency of a scan operation 1005 (e.g., scan N+3).

In an example process not associated with FIG. 13, scan and display operations occur at 125 Hz. However, each operation can operate at frequencies between 122-128 Hz. Without a latency control system 920, the buffer write time 1035 will average out over time as occurring exactly halfway through the display update time 1045. Thus, the mean latency incurred can be approximately 0.5/125 Hz=4 ms. With a latency control system 920 however, the cycle latency can be reduced. For example, if the threshold range is set to 1.0-0.5 ms before a display update time 1045 and the cycle latency 1050 for a cycle 1000 is 2 ms, the latency control system 920 may decrease the scan frequency to 124.5 Hz. Assuming the processing times 1030 are constant, the cycle latency 1050 for the next cycle 1000 is approximately 1.997 ms. Since the cycle latency 1050 is still earlier than the threshold range, the frequency is adjusted again to 124 Hz. Thus, the cycle latency is now approximately 1.991 ms. This process can continue (within the sensor scanning frequency limits) until the buffer write time 1035 occurs within the threshold range. After which, the frequency of the scan operations may be returned to 125 Hz. However, parameter changes (e.g., smaller changes of 0.25 Hz) may continue to be made on successive scans to ensure the buffer write times 1035 remain within the threshold range.

While the scan operations 1005 and display operations 1040 have similar frequencies in the previous figures and examples, this is not required. In some embodiments, scan operations 1005 have different frequencies than display operations 1040. For example, if scan operations 1005 have a higher frequency, time gaps may be added between scan operations 1005 such that a single scan operation 1005 occurs for each display operation 1040. In another example, the frequency of the scan operations 1005 is harmonically related to the frequency of the display operations 1040.

Generally, if the cycle latency 1050 is less than half of a display time 1055 (or another predetermined threshold), the latency control system 920 may adjust one or more parameters to decrease the cycle latency 1050. Said differently, if the buffer write time 1035 is closer to a subsequent display update time 1045 than a previous display update time 1045, the latency control system 920 generally decreases the cycle latency 1050 in a subsequent cycle 1000. For example, the latency control system 920 can decrease the frequency of a scan operation 1005 or increase the frequency of a display operation 1040 (e.g., FIG. 13). In another example, the latency control system 920 delays a start time of a scan operation 1005 (e.g., FIG. 12) or accelerates a start time of a display operation 1040 (e.g., by ending a previous display operation early or decreasing a time gap between display operations 1040).

Different parameter adjustments may be performed if the cycle latency 1050 is larger than half of a display time 1055. These adjustments are described with reference to FIGS. 14-16. If the buffer write time 1035 occurs before the half point 1405 of a display time 1055, then the buffer write time 1035 is closer to a previous display update time 1045 than a subsequent display update time 1045. In these embodiments, the latency control system 920 decreases the cycle latency 1050 by increasing the frequency of a scan operation 1005 (e.g., FIG. 14), decreasing the frequency of a display operation 1040 (e.g., FIG. 15), delaying a start time of a display operation 1040 (e.g., FIG. 16), and/or accelerating a start time of a scan operation 1005 (e.g., also seen in FIG. 16).

Figure 14:
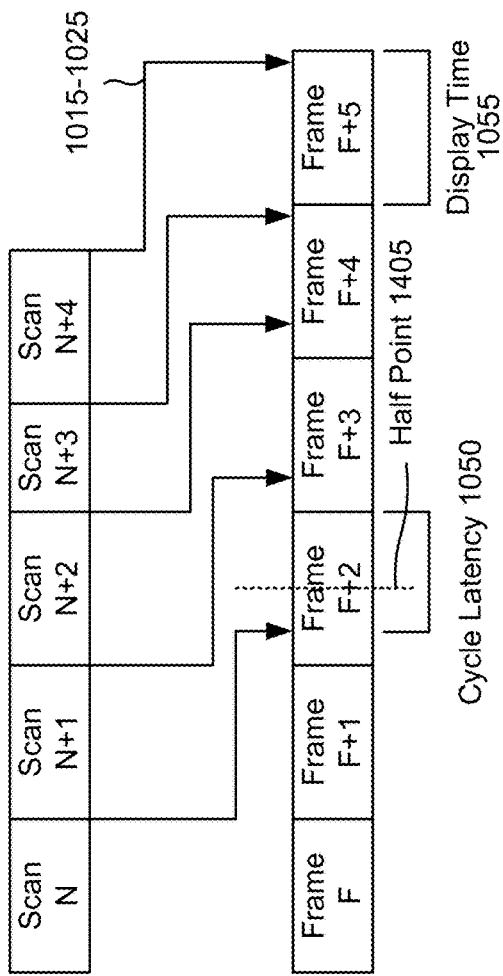
Figure 15:
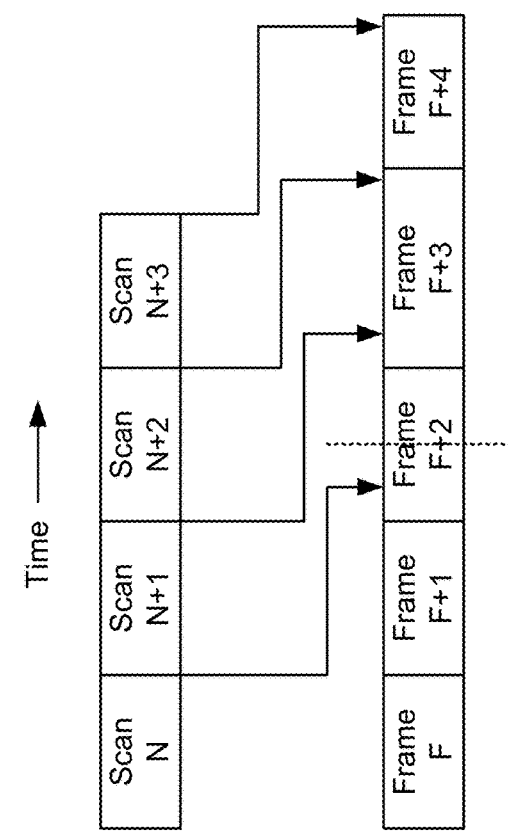

Referring to FIG. 14, the buffer write time 1035 occurs before a half point 1405 of frame F+2. To reduce the cycle latency 1050, the frequency of scan N+3 is decreased. This results in two buffers write times 1035 occurring during frame F+4. Pixel data 955 corresponding to scan N+2 may be overwritten with pixel data 955 corresponding to scan N+3 before the next display update time 1045. Alternatively, scan N+3 may be a partial scan that provides supplemental data for the pixel data 955 corresponding to scan N+2 (e.g., touch data 950 from scan N+3 refines the location of touch events). In other embodiments, the pixel data 955 from scan N+3 is ignored. Referring to FIG. 15, the cycle latency 1050 is reduced by decreasing the frequency of the display operation 1040 corresponding to frame F+3. Similar to FIG. 14, this results in two buffers write times 1035 occurring during a display operation 1040.

Figure 16:
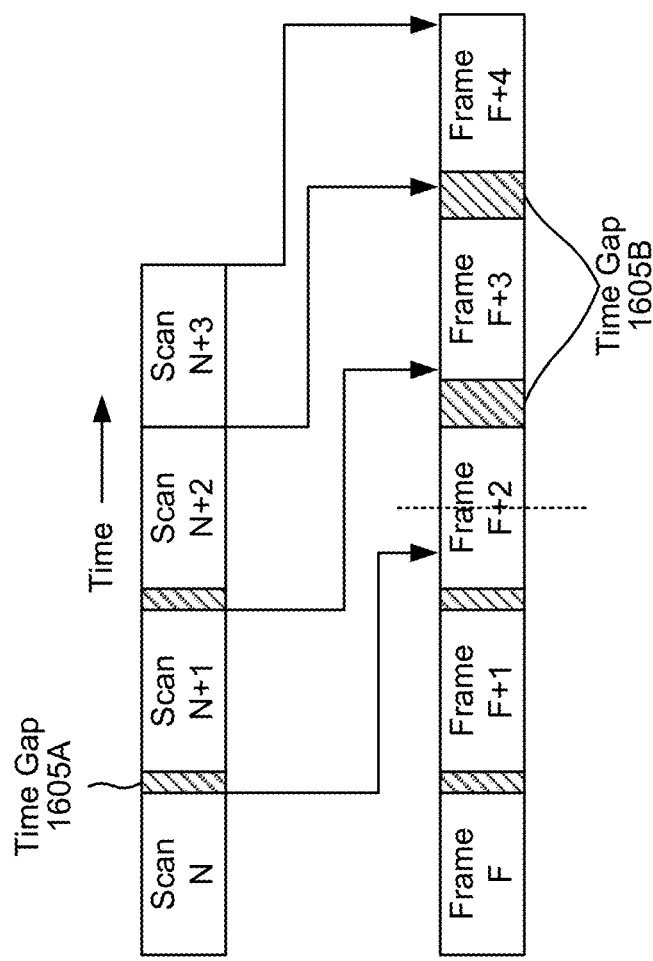

Referring to FIG. 16, time gaps 1650A are illustrated between scan and display operations. The time gaps 1650A may be variable transition times integrated into the operations. The time gaps 1650 may be set by the latency control system 920. Depending on the touch device 905 and display system 915, more or less time gaps 1650 can be present between the operations. In FIG. 16, the cycle latency 1050 is reduced by accelerating a start time of scan N+3 and delaying the start times of frames F+3 and F+4. Specifically, the time gap between touch scans N+2 and N+3 is decreased and the time gaps 1650B between frames F+2, F+3, and F+4 are increased.

In embodiments with single buffers, buffer writing operations 1025 and display operations 1040 are simultaneously performed on the same buffer. In some cases, the display update time 1045 is the time at which one or more specified pixels of the buffer 935 are sent to the display 940. The specified pixels may be pixels updated in response to one or more touch events. For example, if pixels in line ten of the buffer 935 are updated due to do a touch event, the corresponding display update time 1045 may be the time that the pixel data of line ten is sent to the display 940. In other words, there is not a single display update time 1045 for a frame. Rather, the display update time is determined by pixel, by line, or by any other appropriate pixel grouping. Alternatively, the display update time 1045 may be the time that the final line or final pixel of the buffer 935 is sent to the display 940. Similarly, the buffer write time 1035 may be the time that the specified pixels are updated with new pixel data. Display cycles 1000 for an example single buffer system are further described with reference to FIG. 17.

Figure 17:
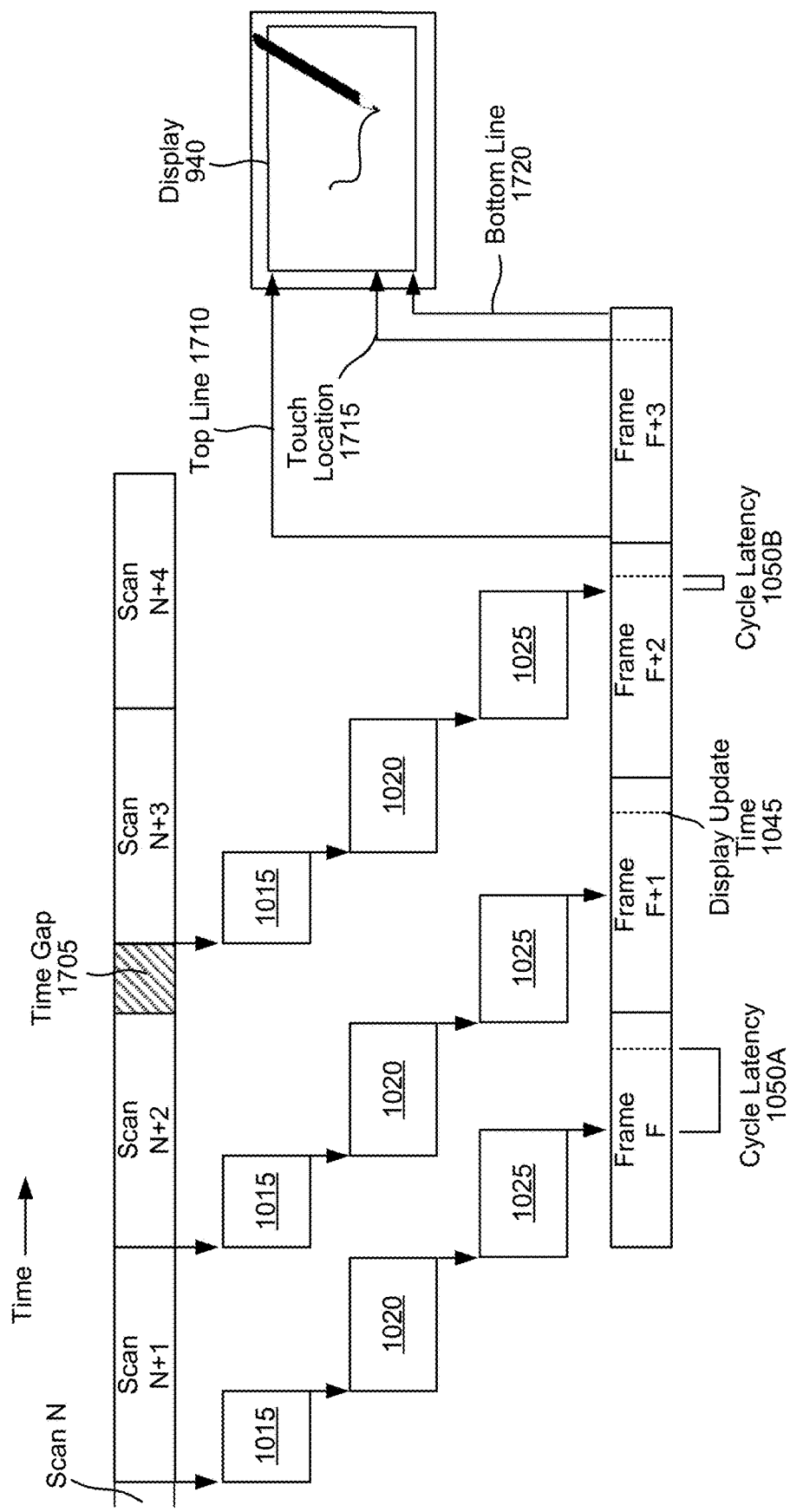

FIG. 17 illustrates a series of display cycles 1000 adjusted by the latency control system 920 for a single buffer system, according to an embodiment. An example displays 940 is also illustrated in the FIG. 17. As seen near the display 940, a touch object is in contact at a touch location 1715 that is located approximately three quarters from the top of the surface. In the example of FIG. 17, during a display operation 1040, pixel data 955 corresponding to the top line 1710 of the display 940 is displayed first while pixel data 955 corresponding to the bottom line 1720 of the display 940 is displayed last. Thus, pixel data 955 corresponding to the touch event may be displayed approximately three quarters through the display operation 1040. In some cases, additional latencies are considered when determining when pixel data 955 corresponding to a touch event is displayed. For example, the time taken for the pixel data 955 to be retrieved from the buffer 935 and displayed by the display 940 may be non-negligible. However, these latencies may be constant and may be determined from a single measurement.

Referring to FIG. 17, to reduce the cycle latency 1050A associated with frame F, the latency control system 920 delays a start time of scan N+3. This delay creates a time gap 1705 between scan N+1 and N+2. Thus, the cycle latency 1050B associated with frame F+2 is reduced. If the cycle latency 1050B is less than a desired threshold latency, then the latency control system 920 may not provide further instructions. If the cycle latency 1050B is more than a desired threshold latency, the latency control system 920 may delay another start time of a scan operation 1005. Alternatively, the latency control system 920 may adjust the frequency of a scan operation 1005, a frequency of a display operation 1040, or a start time of a display operation 1040.

In embodiments where the display update time 1045 corresponds to the location of a touch event, the display update time 1045 may change as a touch object moves along the surface. For example, if a single touch object is moving across the surface 925 and the system has a display rate of 60 Hz, the display update time 1045 may change based on the distance traveled by the object in 16.7 ms. Instead of being reactionary, the display update time 1045 may be updated based on a predicted location of the touch object. For example, if a touch object moves upwards at 2 m/s, then in 10 ms the object will move 20 mm across the surface. This distance can be converted into a fraction of the display height, and therefore, the display update time 1045 can be adjusted accordingly. Predicting the location of a touch location may be used to ensure that objects moving upwards get the benefit of latency optimization. If more than one touch event is detected on the surface, the touch closest to top (or bottom) of the touch surface, the touch event that was detected first, or the most recently detected (or displayed) touch may determine the display update time 1045. In embodiments where touches are classified as corresponding to different types of touch object, the display update time 1045 may be determined from a touch event selected according to a hierarchy of touch event classes. For example, a stylus touch may be prioritized over a finger touch which may in turn be prioritized over a palm touch. Alternatively, the display update time 1045 may be the time that the final line or final pixel in the frame is sent to the display 940.

Another example for dealing with multiple touches includes prioritizing a group of touches. An example group of touches may be five finger touches from a hand, where the five finger touches are within 200 mm of each other (e.g., within 150 mm of each other vertically). In this example, the group corresponds to about 15% of the vertical height of the display (approximately 1080 millimeters of an 86 inch (measured diagonally as is the industry standard practice) display). The display update time 1045 may be determined by the lowest (or highest) touch in the group to ensure touches in the group are updated in the buffer 935 together (or at least have the same cycle latency 1050). Thus, if the lowest touch determines the display update time, then that provides approximately 15% of the display time 1055 for the touches in the group to be written in the buffer 935 before the pixel data 955 is sent to the display 940 (e.g., for a double buffer system). If the display update time for a double buffer system corresponds to the highest touch, then touches below may by delayed by almost an entire display time 1055 because if the display update occurs just after the results of the highest touch are written to the display buffer, the other touches would not be updated until the next frame. In contrast, by choosing the last touch in a group, the previous touches are delayed by a small amount, but none by a lot. On the other hand, for a single buffer system, the highest touch may determine the display update time 1045 such that all touches in the group are written to the display buffer before that portion of the display buffer begins to be sent to the display.

C. Example Method

Figure 18:
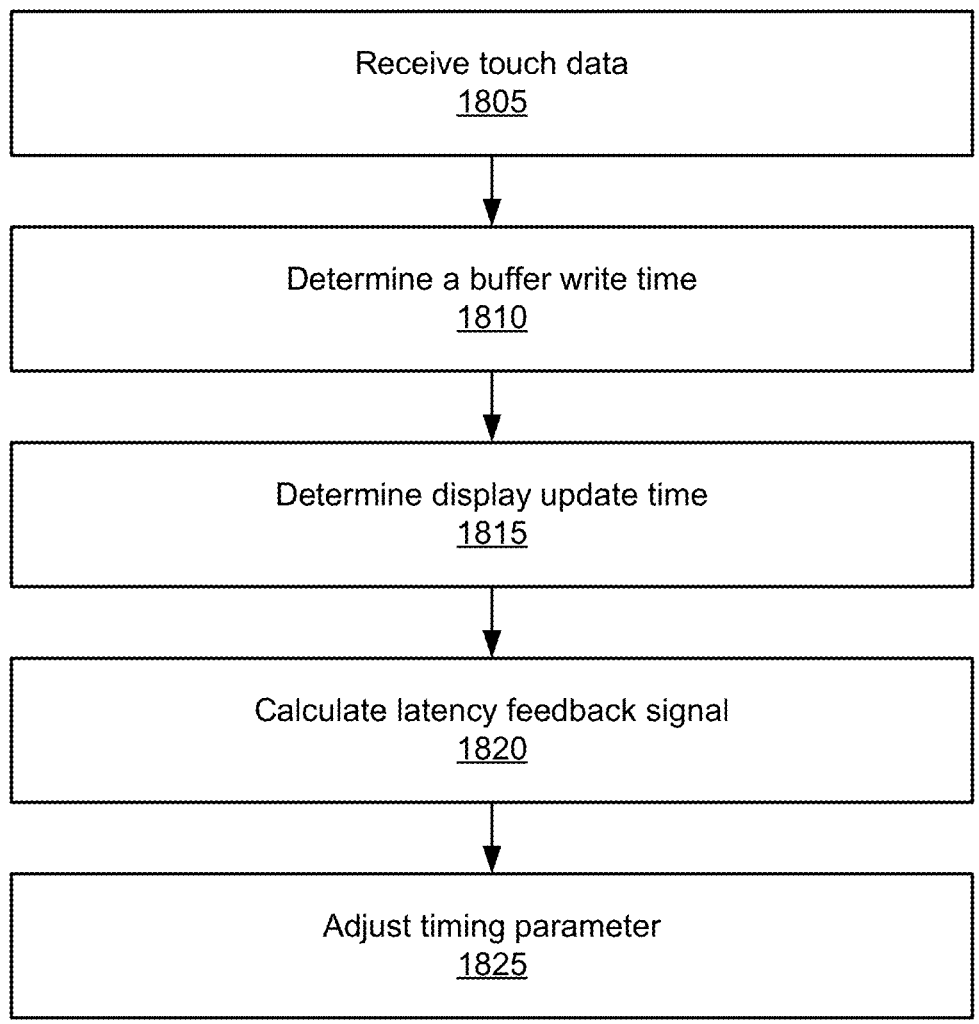
FIG. 18 is a is a flowchart of a method for reducing latency in a touch sensitive system, according to an embodiment.

FIG. 18 is a is a flowchart of a method for reducing latency in a touch sensitive system, according to an embodiment. The steps of the method may be performed in different orders, and the method may include different, additional, or fewer steps.

Touch data is received 1805. The touch data indicates at least one touch event on a touch sensitive surface.

A buffer write time is determined 1810. The buffer write time is a time at which pixel data in a display buffer is updated based on the touch data. In some embodiments, multiple buffer write times are determined 1810. In some embodiments, determining 1810 the buffer write time comprises estimating, by a model, the buffer write time based on the touch data.

A display update time is determined 1815. The display update time is based on when the pixel data from the display buffer is provided to a display. In some embodiments, multiple display update times are determined 1815. In some embodiments, the display update time is before the buffer write time and the display update time corresponds to a most recent update of the display.

In some embodiments, the display buffer is a double buffer and the display update time is a time at which a back frame is switched to a front frame. In other embodiments, the display buffer is a single buffer and the display update time is a time at which a portion of one or more pixels in the display buffer is sent to the display.

A latency feedback signal is calculated 1820. The latency feedback signal calculation is based on the buffer write time and the display update time. Calculating 1820 the latency feedback signal may include calculating a difference between the buffer write time and the display update time. In some embodiments, if multiple buffer write times and multiple display update times are determined, calculating 1820 the latency feedback signal includes calculating an average, a median, or a percentile difference between the buffer write times and the display update times.

A timing parameter is adjusted 1825. The timing parameter is adjusted based on the latency feedback signal such that latency between a subsequent touch event and displaying images based on the subsequent touch event is reduced. Examples of timing parameters include start times and frequencies of touch scan operations and display operations.

Adjusting 1825 the parameter of the touch sensitive system may include decreasing a frequency of a scan operation of the touch sensitive surface responsive to the difference between the buffer write time and the display update time exceeding a threshold and responsive to the buffer write time occurring before the display update time. In some embodiments, adjusting 1825 the parameter of the touch sensitive system includes increasing a frequency of a scan operation of the touch sensitive surface responsive to the difference between the buffer write time and the display update time exceeding a second threshold and the buffer write time occurring before the display update time, wherein the second threshold is larger than the threshold.

Adjusting 1825 the parameter of the touch sensitive system may include increasing a frequency of a display operation of the display system responsive to the difference between the buffer write time and the display update time exceeding a threshold and responsive to the buffer write time occurring before the display update time. In some embodiments, adjusting the parameter of the touch sensitive system includes decreasing a frequency of a display operation of the display system responsive to the difference between the buffer write time and the display update time exceeding a second threshold and the buffer write time occurring before the display update time, wherein the second threshold is larger than the threshold.

Adjusting 1825 the parameter of the touch sensitive system includes delaying a start time of a scan operation of the touch sensitive surface responsive to the difference between the buffer write time and the display update time exceeding a threshold and responsive to the buffer write time occurring before the display update time. In some embodiments, adjusting the parameter of the touch sensitive system comprises accelerating a start time of a scan operation of the touch sensitive surface responsive to the difference between the buffer write time and the display update time exceeding a second threshold and the buffer write time occurring before the display update time, wherein the second threshold is larger than the threshold.

Adjusting 1825 the parameter of the touch sensitive system may include accelerating a start time of a display operation of the display system responsive to the difference between the buffer write time and the display update time exceeding a threshold and responsive to the buffer write time occurring before the display update time. In some embodiments, adjusting the parameter of the touch sensitive system includes delaying a start time of a display operation of the display system responsive to the difference between the buffer write time and the display update time exceeding a second threshold and the buffer write time occurring before the display update time, wherein the second threshold is larger than the threshold.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein.

What is claimed is:

1. A method for reducing latency in a touch sensitive system, the method comprising:
   receiving touch data indicating at least one touch event on a touch sensitive surface;
   determining a buffer write time at which pixel data in a display buffer is updated based on the touch data;
   determining a display update time based on when the pixel data from the display buffer is provided to a display;
   calculating a latency feedback signal based on the buffer write time and the display update time; and
   adjusting a timing parameter of the touch sensitive system based on the latency feedback signal such that latency between a subsequent touch event and displaying images based on the subsequent touch event is reduced, wherein the adjusted timing parameter is a frequency of a scan operation of the touch sensitive surface, a frequency of a display operation of the display system, a start time of the scan operation of the touch sensitive surface, or a start time of the display operation of the display system.

2. The method of claim 1, wherein:
   calculating the latency feedback signal comprises calculating a difference between the buffer write time and the display update time; and
   adjusting the timing parameter of the touch sensitive system comprises decreasing the frequency of the scan operation of the touch sensitive surface responsive to the difference between the buffer write time and the display update time exceeding a first threshold and responsive to the buffer write time occurring before the display update time.

3. The method of claim 2, wherein adjusting the timing parameter of the touch sensitive system comprises increasing the frequency of the scan operation of the touch sensitive surface responsive to the difference between the buffer write time and the display update time exceeding a second threshold and the buffer write time occurring before the display update time, wherein the second threshold is larger than the first threshold.

4. The method of claim 1, wherein:
calculating the latency feedback signal comprises calculating a difference between the buffer write time and the display update time; and
adjusting the timing parameter of the touch sensitive system comprises increasing the frequency of the display operation of the display system responsive to the difference between the buffer write time and the display update time exceeding a first threshold and responsive to the buffer write time occurring before the display update time.

5. The method of claim 4, wherein adjusting the timing parameter of the touch sensitive system comprises decreasing the frequency of the display operation of the display system responsive to the difference between the buffer write time and the display update time exceeding a second threshold and the buffer write time occurring before the display update time, wherein the second threshold is larger than the first threshold.

6. The method of claim 1, wherein:
calculating the latency feedback signal comprises calculating a difference between the buffer write time and the display update time; and
adjusting the timing parameter of the touch sensitive system comprises delaying the start time of the scan operation of the touch sensitive surface responsive to the difference between the buffer write time and the display update time exceeding a first threshold and responsive to the buffer write time occurring before the display update time.

7. The method of claim 6, wherein adjusting the timing parameter of the touch sensitive system comprises accelerating the start time of the scan operation of the touch sensitive surface responsive to the difference between the buffer write time and the display update time exceeding a second threshold and the buffer write time occurring before the display update time, wherein the second threshold is larger than the first threshold.

8. The method of claim 1, wherein:
calculating the latency feedback signal comprises calculating a difference between the buffer write time and the display update time; and
adjusting the timing parameter of the touch sensitive system comprises accelerating the start time of the display operation of the display system responsive to the difference between the buffer write time and the display update time exceeding a first threshold and responsive to the buffer write time occurring before the display update time.

9. The method of claim 8, wherein adjusting the timing parameter of the touch sensitive system comprises delaying the start time of the display operation of the display system responsive to the difference between the buffer write time and the display update time exceeding a second threshold and the buffer write time occurring before the display update time, wherein the second threshold is larger than the first threshold.

10. The method of claim 1, wherein multiple buffer write times are determined and multiple display update times are determined, and wherein calculating the latency feedback signal comprises calculating an average, a median, or a percentile difference between the buffer write times and the display update times.

11. The method of claim 1, wherein determining the buffer write time comprises estimating, by a model, the buffer write time based on the touch data.

12. The method of claim 1, wherein the display buffer is a double buffer, and wherein the display update time is a time at which a back frame is switched to a front frame.

13. The method of claim 1, wherein the display buffer is a single buffer, and wherein the display update time is a time at which a portion of one or more pixels in the display buffer is sent to the display.

14. The method of claim 1, wherein the display update time is before the buffer write time and corresponds to a most recent update of the display.

15. A non-transitory computer-readable storage medium storing executable computer program code that, when executed by one or more processors, cause the one or more processors to perform operations comprising:
receiving touch data indicating at least one touch event on a touch sensitive surface;
determining a buffer write time at which pixel data in a display buffer is updated based on the touch data;
determining a display update time based on when the pixel data from the display buffer is provided to a display;
calculating a latency feedback signal based on the buffer write time and the display update time; and
adjusting a timing parameter of a touch sensitive system based on the latency feedback signal such that latency between a subsequent touch event and displaying images based on the subsequent touch event is reduced, wherein the adjusted timing parameter is a frequency of a scan operation of the touch sensitive surface, a frequency of a display operation of the display system, a start time of the scan operation of the touch sensitive surface, or a start time of the display operation of the display system.

16. The non-transitory computer-readable storage medium of claim 15, wherein:
calculating the latency feedback signal comprises calculating a difference between the buffer write time and the display update time; and
adjusting the timing parameter of the touch sensitive system comprises decreasing the frequency of the scan operation of the touch sensitive surface responsive to the difference between the buffer write time and the display update time exceeding a first threshold and responsive to the buffer write time occurring before the display update time.

17. The non-transitory computer-readable storage medium of claim 15, wherein:
calculating the latency feedback signal comprises calculating a difference between the buffer write time and the display update time; and
adjusting the timing parameter of the touch sensitive system comprises increasing the frequency of the display operation of the display system responsive to the difference between the buffer write time and the display update time exceeding a first threshold and responsive to the buffer write time occurring before the display update time.

18. The non-transitory computer-readable storage medium of claim 15, wherein:
calculating the latency feedback signal comprises calculating a difference between the buffer write time and the display update time; and
adjusting the timing parameter of the touch sensitive system comprises delaying the start time of the scan operation of the touch sensitive surface responsive to the difference between the buffer write time and the display update time exceeding a first threshold and responsive to the buffer write time occurring before the display update time.

19. The non-transitory computer-readable storage medium of claim 15, wherein:
   calculating the latency feedback signal comprises calculating a difference between the buffer write time and the display update time; and
   adjusting the timing parameter of the touch sensitive system comprises accelerating the start time of the display operation of the display system responsive to the difference between the buffer write time and the display update time exceeding a first threshold and responsive to the buffer write time occurring before the display update time.

20. The non-transitory computer-readable storage medium of claim 15, wherein multiple buffer write times are determined and multiple display update times are determined, and wherein calculating the latency feedback signal comprises calculating an average, a median, or a percentile difference between the buffer write times and the display update times.

* * * * *